(12) United States Patent
Ellzey et al.

(10) Patent No.: US 10,472,046 B1
(45) Date of Patent: Nov. 12, 2019

(54) INTERNAL WING CONTROL SURFACE LINKAGE SYSTEM

(71) Applicant: LOCKHEED MARTIN CORPORATION, Bethesda, MD (US)

(72) Inventors: Steven J. Ellzey, Grand Prairie, TX (US); James C. Copp, Arlington, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 412 days.

(21) Appl. No.: 15/389,048

(22) Filed: Dec. 22, 2016

Related U.S. Application Data

(63) Continuation-in-part of application No. 15/014,399, filed on Feb. 3, 2016, now Pat. No. 10,124,880.

(51) Int. Cl.
*B64C 9/16* (2006.01)
*B64C 39/02* (2006.01)
(Continued)

(52) U.S. Cl.
CPC .............. *B64C 9/16* (2013.01); *B64C 3/56* (2013.01); *B64C 9/36* (2013.01); *B64C 39/024* (2013.01);
(Continued)

(58) Field of Classification Search
CPC .. B64C 9/16; B64C 3/385; B64C 9/06; B64C 2201/042; B64C 9/36; B64C 2201/20;
(Continued)

(56) References Cited

U.S. PATENT DOCUMENTS 2,670,909 A * 3/1954 Replogle ............... B64C 9/16
244/213
3,655,149 A 4/1972 Wiliams
(Continued)

FOREIGN PATENT DOCUMENTS

EP 0782955 B1 3/2002

OTHER PUBLICATIONS

Author Unknown, "Suicide Bdyat: Development Trends Loitering Munitions. Part 2," topwar.ru, xn—ctbjbare5aadbdikvl8n.xn—p1ai/tehnika-i-vooruzhenie/184538-samoubijci-bdyat-napravleniya-razvitiya-barrazhiruyushih-boepripasov-chast-2_93368.html, 2012, military pensioners, pp. 1-11.

*Primary Examiner* — Assres H Woldemaryam
(74) *Attorney, Agent, or Firm* — Terry M. Sanks, Esq.; Beusse Wolter Sanks & Maire, PLLC

(57) ABSTRACT

An internal wing control surface linkage system comprising: an actuator arm configured to rotate around a first rotation axis within an airfoil body. A linking arm is mounted within the airfoil body. The linking arm comprises a linking tube and a linkage rod slideably received within the linking tube. The linking tube comprises a hinged end pivotally coupled to the actuator arm about a first pivot axis parallel to the first rotation axis to cause deflection of a control surface coupled to the airfoil body during rotation of the actuator arm. The linkage rod comprising a hinged end coupled to a clevis about a second pivot axis of the control surface. A spherical bearing swivelly coupling the linking arm and providing a fixed swivel pivot which swivels the linking arm, as the linking tube simultaneously slides within the spherical bearing and, in combination, the rod simultaneously slides within the linking tube.

20 Claims, 18 Drawing Sheets

(51) Int. Cl.
*B64C 9/36* (2006.01)
*B64C 3/56* (2006.01)
(52) U.S. Cl.
CPC .... *B64C 2201/021* (2013.01); *B64C 2201/08* (2013.01); *B64C 2201/102* (2013.01)
(58) Field of Classification Search
CPC . B64C 2201/201; B64C 39/024; B64C 11/28; B64C 3/546; B64C 11/063; B64C 3/56; B64C 2201/021; B64C 2201/102; B64C 2201/08
See application file for complete search history.

(56) References Cited

U.S. PATENT DOCUMENTS

| | | | | |
|---|---|---|---|---|
| 5,207,400 A | * | 5/1993 | Jennings | B64C 9/16 244/216 |
| 5,388,788 A | * | 2/1995 | Rudolph | B64C 7/00 244/212 |
| 7,891,611 B2 | * | 2/2011 | Huynh | B64C 9/16 244/213 |
| 8,382,045 B2 | | 2/2013 | Manley et al. | |
| 9,061,753 B2 | * | 6/2015 | Beyer | B64C 9/10 |
| 9,376,203 B2 | | 6/2016 | Tieys et al. | |
| 2005/0011994 A1 | * | 1/2005 | Sakurai | B64C 9/16 244/212 |
| 2007/0176051 A1 | * | 8/2007 | Good | B64C 9/16 244/215 |
| 2010/0286849 A1 | | 11/2010 | Huynh et al. | |
| 2011/0042525 A1 | | 2/2011 | Parker | |
| 2012/0280080 A1 | | 11/2012 | Lubenow et al. | |
| 2015/0191242 A1 | | 7/2015 | Maclean et al. | |
| 2015/0292561 A1 | * | 10/2015 | McNeil | F16C 39/02 244/213 |
| 2015/0346043 A1 | * | 12/2015 | Kohuth | G01L 5/0028 73/818 |
| 2016/0229524 A1 | * | 8/2016 | Huynh | B64C 9/00 |
| 2016/0264232 A1 | * | 9/2016 | Briancourt | B64C 3/56 |

* cited by examiner

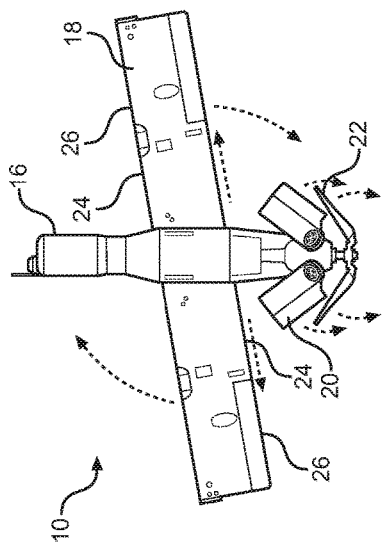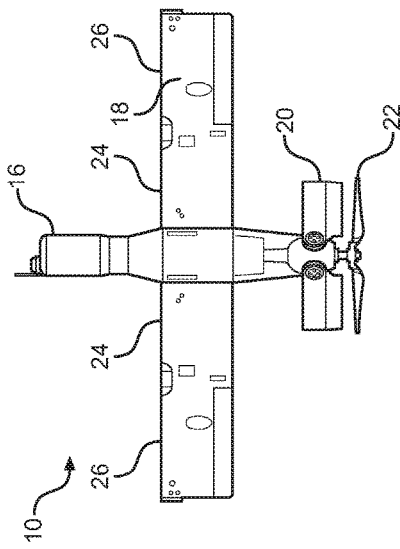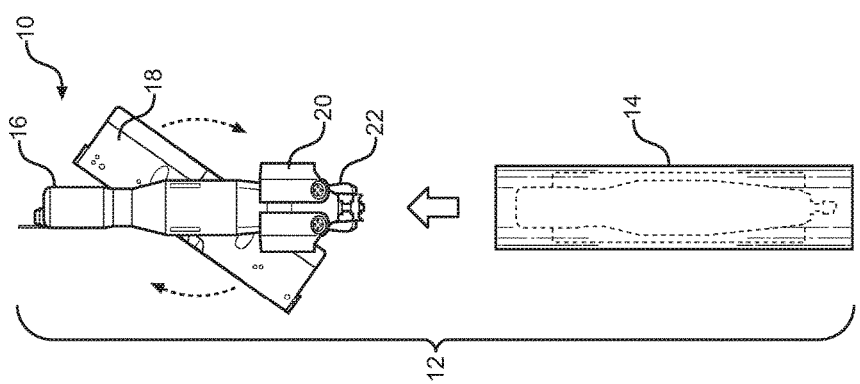

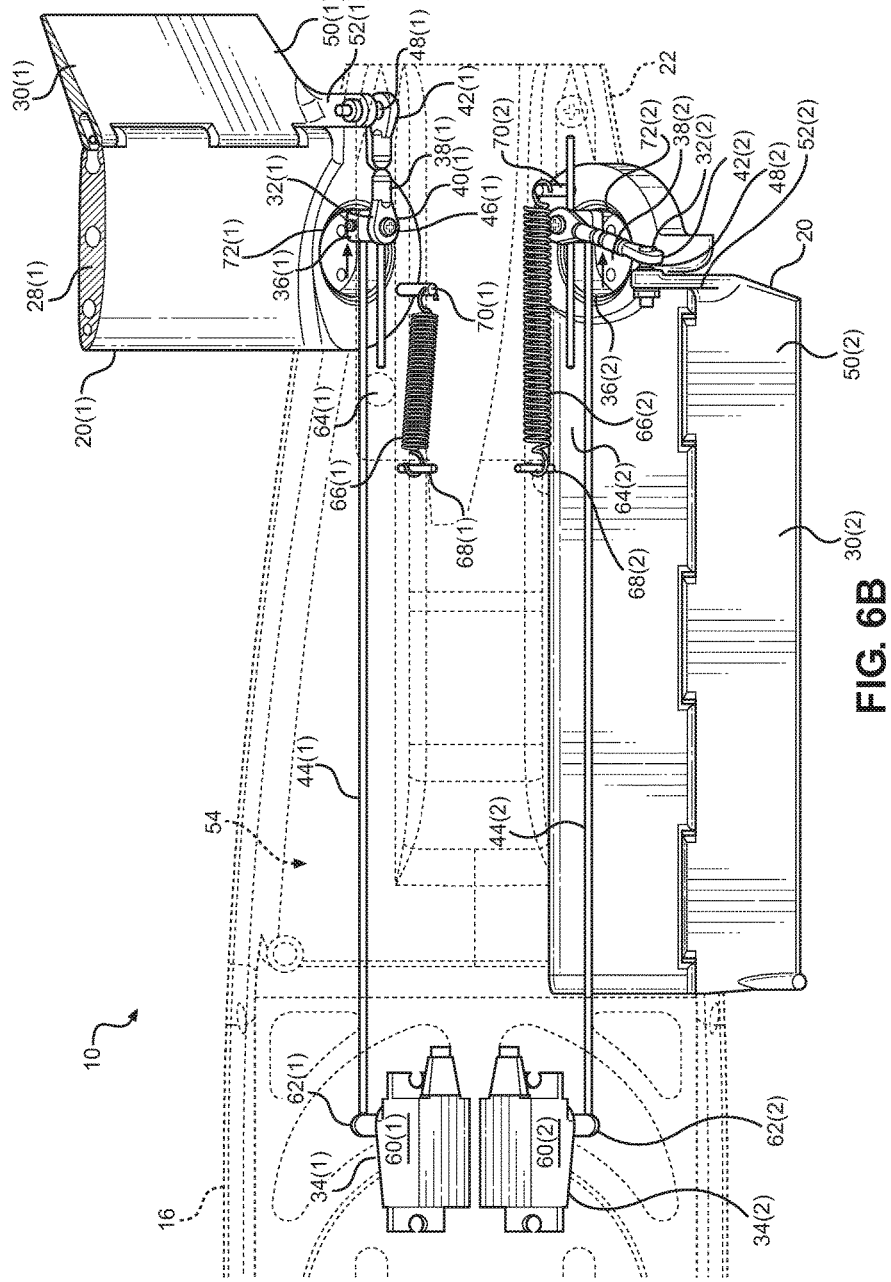

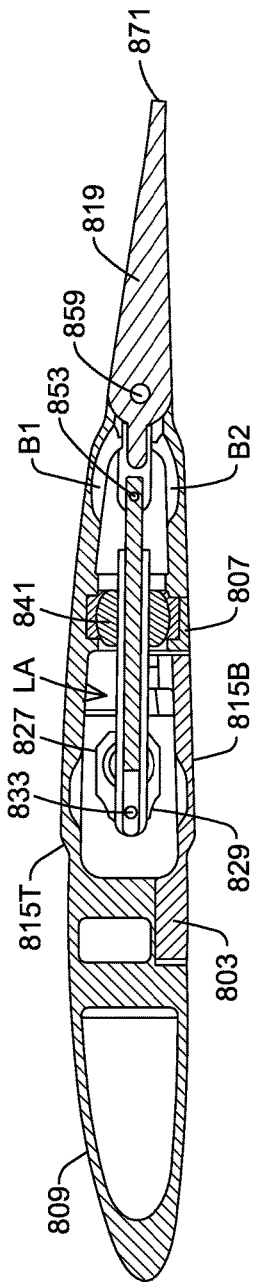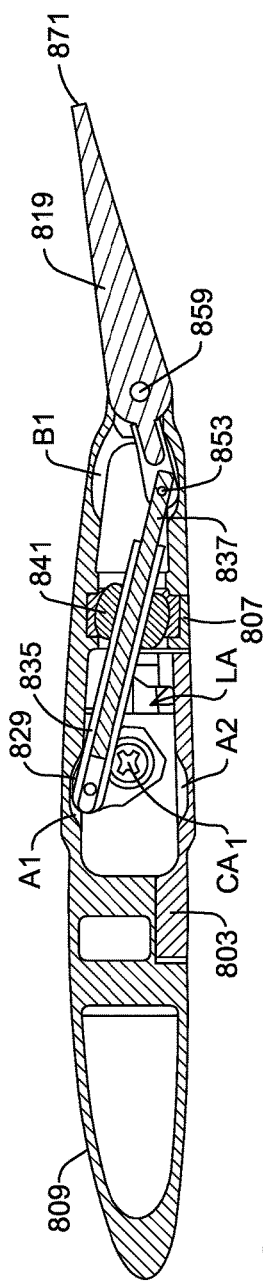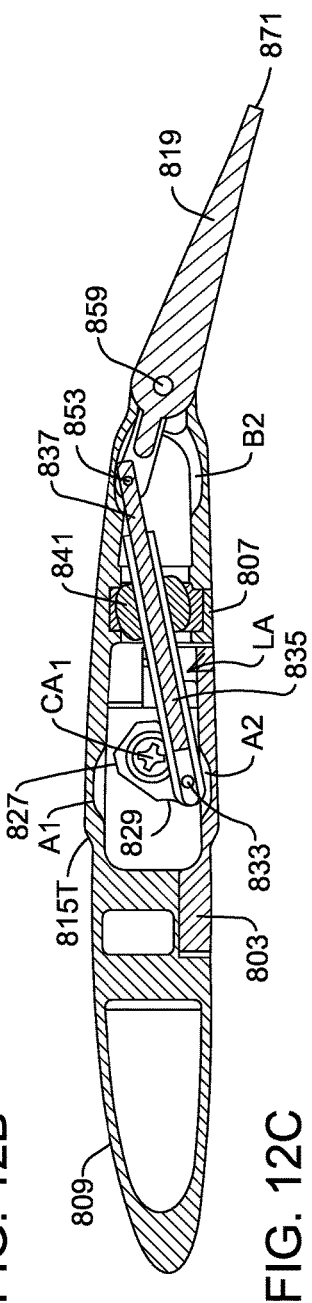

INTERNAL WING CONTROL SURFACE LINKAGE SYSTEM

CROSS-REFERENCE TO RELATED APPLICATIONS

This application is a continuation-in-part of U.S. patent application Ser. No. 15/014,399, filed Feb. 3, 2016, titled "ROTATABLE CONTROL SURFACE ASSEMBLY FOR AN UNMANNED AERIAL VEHICLE," assigned to Lockheed Martin Corporation, incorporated herein by reference as if set forth in full below.

TECHNICAL FIELD

The field of the disclosure relates to an aircraft, such as an unmanned aerial vehicle (UAV), and in particular to an internal wing control surface linkage system embedded in a wing sub-assembly.

BACKGROUND

Unmanned aerial vehicles (UAVs) are aircraft that are capable of flight without an onboard pilot. UAVs may be capable of autonomous flight, and may also be capable of being controlled by a remotely located human pilot. As a result, UAVs can be made smaller and more portable than manned aircraft. However, many UAVs require a plurality of fins with control surfaces, such as wings, rudders, and/or tailfins, to operate properly, which complicates storage and portability of the UAV. Accordingly, there is a need for a UAV with fins that can be quickly and reliably converted back and forth between a stowed configuration and a deployed configuration without interfering with the operation of the UAV.

SUMMARY

According to an aspect of the embodiments, an internal wing control surface linkage system is provided. The internal wing control surface linkage system comprising: an actuator arm configured to rotate around a first rotation axis within a cavity of an airfoil body and a linking arm mountable within the cavity of the airfoil body. The linking arm has a linking tube and a linkage rod slideably received within the linking tube, wherein the linking tube comprising a hinged end pivotally coupled to the actuator arm about a first pivot axis parallel to the first rotation axis to cause deflection of a control surface coupled to a trailing edge of an airfoil body during rotation of the actuator arm. The linkage rod comprising a hinged end pivotally coupled to a clevis about a second pivot axis coupled to the control surface. A spherical bearing mountable in the cavity and swivelly coupling the linking arm. Deflection of a tip of the control surface relative to the airfoil body is achieved, via a spherical bearing providing a fixed swivel pivot which swivels the linking arm, as the linking tube simultaneously slides within the spherical bearing and, in combination, while the rod simultaneously slides within the linking tube to allow rotational freedom of motion about the first pivot axis and the second pivot axis.

Another aspect of the embodiments includes an unmanned aerial vehicle (UAV) comprising: a wing sub-assembly comprising an airfoil body having an interior cavity and a control surface with a clevis coupled to a trailing edge of the airfoil body and a tip. An internal wing control surface linkage system comprising: an actuator arm coupled to rotate around a first rotation axis within the cavity of the airfoil body. A linking arm mounted in the cavity of the airfoil body. The linking arm having a linking tube and a linkage rod slideably received within the linking tube, wherein the linking tube comprises a hinged end pivotally coupled to the actuator arm about a first pivot axis parallel to the first rotation axis to cause deflection of the control surface during rotation of the actuator arm. The linkage rod comprising a hinged end pivotally coupled to the clevis about a second pivot axis coupled to the control surface. A spherical bearing cradled in the cavity and swivelly coupling the linking arm. Deflection of a tip of the control surface relative to the airfoil body is achieved, via the spherical bearing providing a fixed swivel pivot which swivels the linking arm, as the linking tube simultaneously slides within the spherical bearing and, in combination, while the rod simultaneously slides within the linking tube to allow rotational freedom of motion about the first pivot axis and the second pivot axis.

A further aspect of the embodiments includes a method comprising: rotating an actuator arm coupled to rotate around a first rotation axis within an interior cavity of an airfoil body; rotating a linking arm in the cavity of the airfoil body by the actuator arm wherein the linking arm includes a linking tube and a linkage rod slideably received within the linking tube, wherein the linking tube comprising a hinged end pivotally coupled to the actuator arm about a first pivot axis parallel to the first rotation axis to cause deflection of a control surface coupled to a trailing edge of an airfoil body during rotation of the actuator arm and wherein the linkage rod comprising a hinged end pivotally coupled to a clevis about a second pivot axis coupled to the control surface; swivelly coupling the linking arm to a spherical bearing mounted in the cavity; and deflecting a tip of the control surface relative to the airfoil body via a spherical bearing providing a fixed swivel pivot which pivots the linking arm, as the linking tube simultaneously slides within the spherical bearing and, in combination, while the rod simultaneously slides within the linking tube to allow rotational freedom of motion about the first pivot axis and the second pivot axis.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A-1C illustrate an unmanned aerial vehicle (UAV) according to an embodiment being launched from a storage and launch tube, with the UAV converting from a stowed configuration to a deployed configuration during launch;

FIGS. 6A and 6B illustrate bottom cutaway views of the UAV of FIGS. 1A-5, with a left fin in the deployed configuration and a right fin in the stowed configuration;

FIG. 12A illustrates a cross sectional view of the wing sub-assembly with the internal wing control surface linkage system installed in the airfoil body and with the tip of the wing's control surface at 0°;

FIG. 12B illustrates a cross sectional view of the wing sub-assembly with the internal wing control surface linkage system installed in the airfoil body and with the tip of the wing's control surface deflected upward;

FIG. 12C illustrates a cross sectional view of the wing sub-assembly with the internal wing control surface linkage system installed in the airfoil body and with the tip of the wing's control surface deflected downward.

DETAILED DESCRIPTION

Figure 2A:
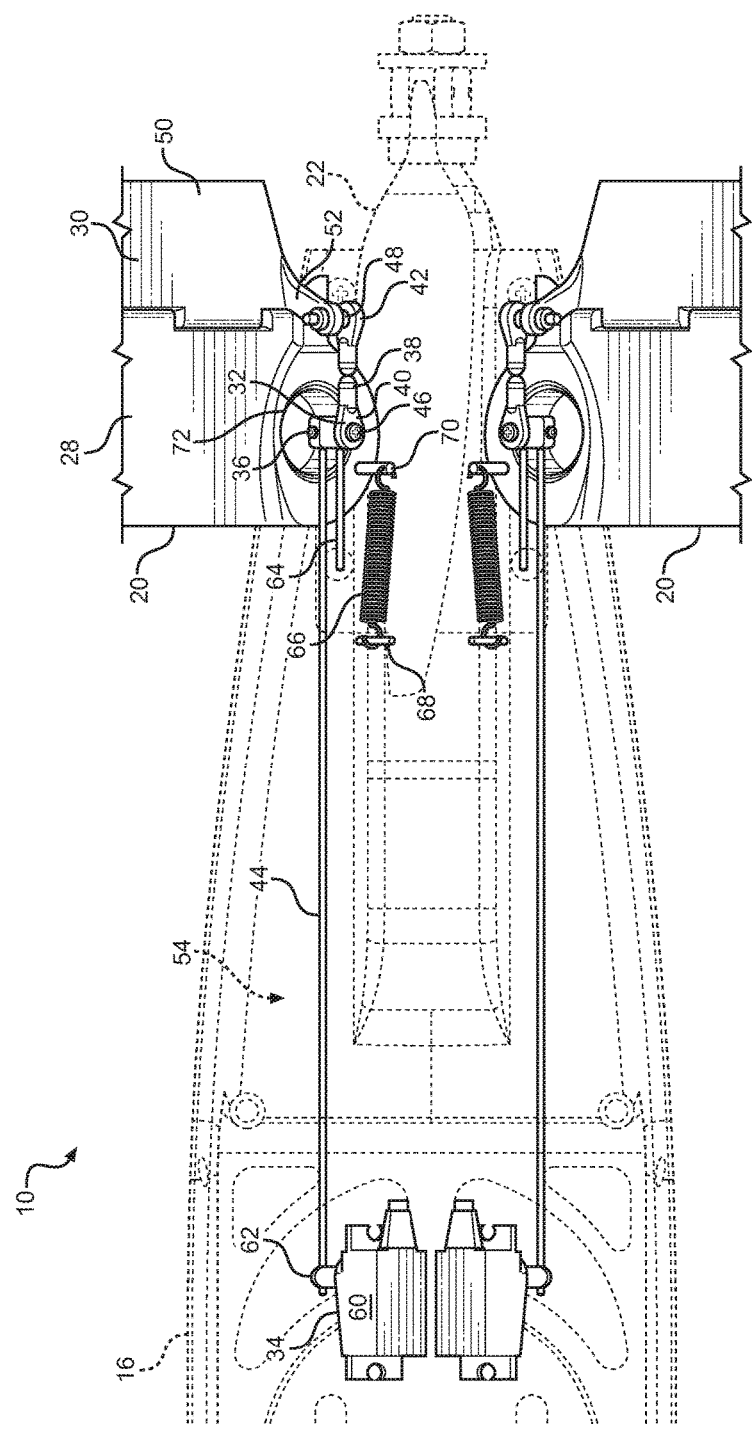
FIGS. 2A-2C illustrate internal components of the UAV of FIGS. 1A-1C in the deployed configuration, to illustrate operation of tail fin sub-assemblies of the UAV when deployed.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein. The term "substantially" used herein in conjunction with a numeric value means any value that is within a range of five percent greater than or five percent less than the numeric value. The term "substantially" used herein in conjunction with an angular definition means any value that is within a range of five degrees greater than or five degrees less than the angular relationship.

Embodiments include a control surface assembly for an unmanned aerial vehicle (UAV). The control surface assembly comprises a fin configured to be rotatably coupled to a fuselage of the UAV, with a control surface member rotatably coupled to the fin. A control surface linkage is configured to be coupled between the control surface member and an actuator disposed in the fuselage. The fin is rotatable with respect to the fuselage between a stowed configuration, in which the UAV is prepared for storage, and a deployed configuration, in which the UAV is capable of flight. In the deployed configuration, the control surface linkage is configured to rotate the control surface member with respect to the fin when the actuator actuates the control surface linkage. In the stowed configuration, however, the control surface linkage is configured to move with respect to the fin without rotating the control surface member, when the actuator actuates the control surface linkage.

One advantage of disposing the actuator in the fuselage is that actuators may contain relatively heavy components, such as a motor, for example, that can interfere with the desired weight distribution of the UAV. For example, disposing the actuator on or in the rotatable fin itself can interfere with the aerodynamic characteristics, and can also make the UAV "tail-heavy" when disposed on or in a rearwardly disposed fin, such as a tailfin or rudder. For many UAV designs, it is more desirable to locate the heavier actuator components inside the fuselage in a forward location for optimal weight distribution.

This arrangement requires a mechanical linkage between the actuator and the control surface, but this presents difficulties when the fin is movable with respect to the fuselage. The mechanical linkage must be capable of moving the control surface when the fin is deployed, and the linkage must also be arranged so that actuating the linkage when the fin is deployed does not damage or stress the linkage or fin when the fin is stowed. One advantage of embodiments described herein is that a control surface linkage can operate the control surface in the deployed configuration and can also be actuated in the stowed configuration without damaging or stressing the control surface linkage or fin.

Before discussing the details of an example control surface linkage, a UAV 10 having a deployed and stowed configuration according to an embodiment is described in relation to FIGS. 1A-1C. The UAV 10 is part of a portable launch system 12 that also comprises a storage and launch tube 14. In this embodiment, the UAV 10 has a fuselage 16 sized to be stored in an interior of the storage and launch tube 14. The UAV 10 includes a wing sub-assembly 18, a pair of tail fin sub-assemblies 20, and a propeller 22, each of which is movable back and forth between the deployed and stowed configuration. In the stowed configuration of this embodiment, the wing sub-assembly 18 is folded and rotated, the tail fin sub-assemblies 20 are rotated, and the propeller 22 is folded so that the UAV 10 can be compactly stored in the storage and launch tube 14. In this embodiment, as shown in FIG. 1A, the storage and launch tube 14 may contain a launch mechanism that launches the UAV 10 out of the storage and launch tube 14. As the UAV 10 exits the storage and launch tube 14, FIGS. 1B and 1C illustrate the wing sub-assembly 18, the tail fin sub-assemblies 20 and the propeller 22 automatically rotating and/or folding into the deployed configuration. For example, a wing body 24 of the wing sub-assembly 18 automatically rotates with respect to the fuselage 16, the wing extension members 26 automatically unfold into place, and the propeller 22 also unfolds away from the fuselage into place. Each tail fin sub-assembly 20 is also configured to automatically rotate with respect to the fuselage 16 when the UAV 10 is launched from the storage and launch tube 14. In this manner, the UAV 10 can convert itself from the stowed configuration to the deployed configuration within seconds of being launched from the storage and launch tube 14.

Figure 2B:
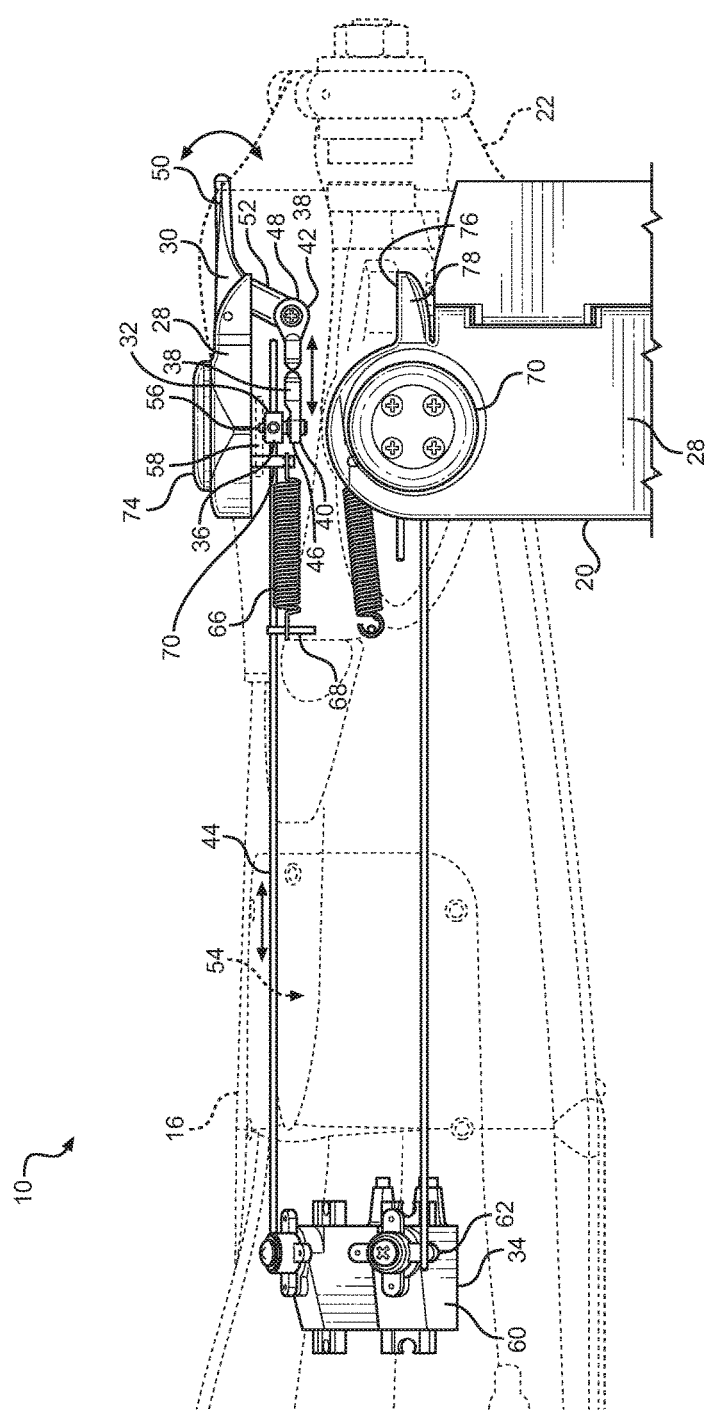
Figure 2C:
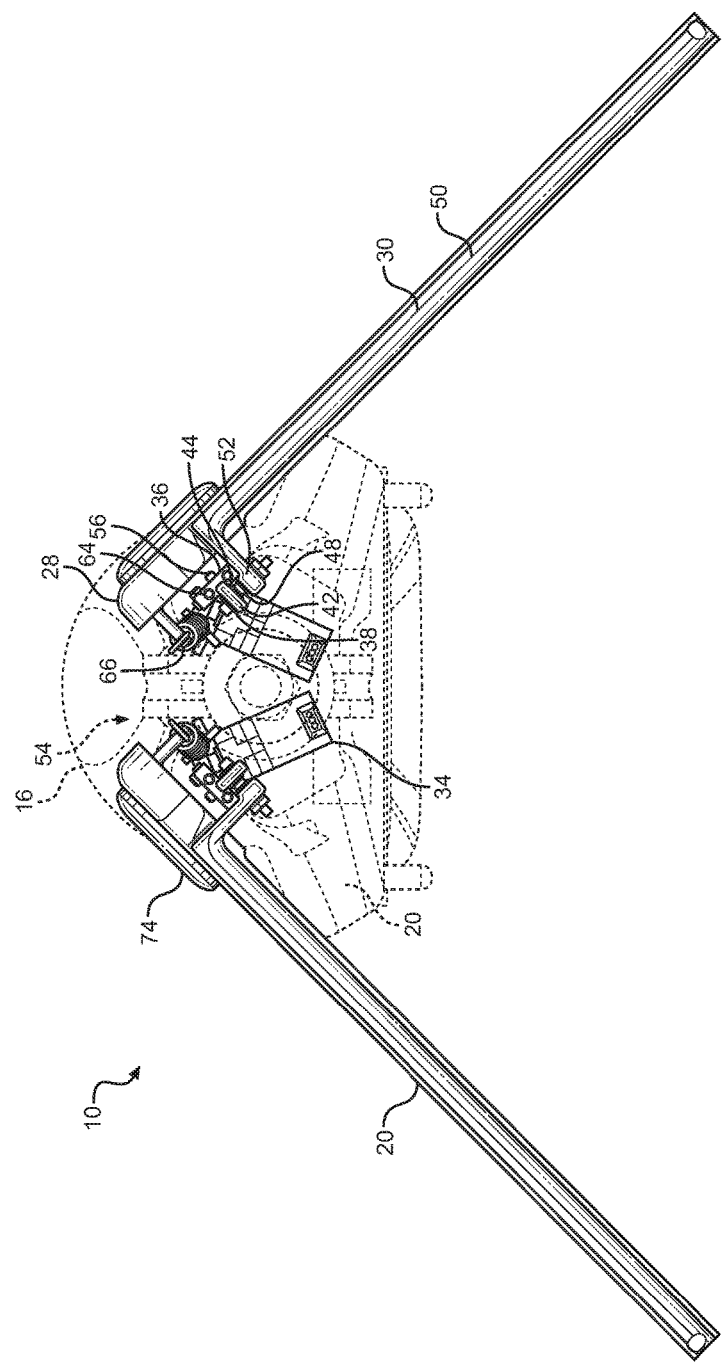

As discussed above, it is desirable to locate the heavier components within the fuselage 16, but this makes it difficult to mechanically control the movable elements located in the wing sub-assembly 18 and particularly in the tail fin sub-assemblies 20. In this regard, FIGS. 2A-2C illustrate internal components of the UAV 10 in the deployed configuration, to illustrate operation of the tail fin sub-assemblies 20 during flight. In particular, FIG. 2A is a bottom cutaway view, FIG. 2B is a top cutaway view at a 45-degree offset, and FIG. 2C is a rear cutaway view of the UAV 10. As shown by FIGS. 2A-2C, each tail fin sub-assembly 20 includes a fin 28 that is rotatably coupled to the fuselage 16, which allows the tail fin sub-assembly 20 to rotate back and forth between the deployed and stowed configuration. Each fin 28 has a control surface member 30 rotatably coupled thereto. In this embodiment, as shown by FIG. 2B, the tail fin sub-assembly 20 is arranged at a 45-degree downward angle with respect to the fuselage 16. This type of tail fin sub-assembly 20 is commonly called a ruddervator, because its control surface member 30 functions as a rudder and an elevator simultaneously. It should be understood, however, that aspects of the disclosed embodiments are equally applicable to other types of fins, such as, for example, a wing, a tailfin, rudder, etc.

In this embodiment, each tail fin sub-assembly 20 includes a control surface linkage 32 coupled between the control surface member 30 and an actuator 34 disposed in the fuselage 16. The control surface linkage 32 is configured to be actuated by the actuator 34 to rotate the control surface member 30 with respect to the fin 28. The control surface linkage 32 includes a translation member 36 configured to translate in a longitudinal direction with respect to the fuselage 16. A control link 38 is coupled between the translation member 36 at a first end 40 and the control surface 30 at a second end 42. In this embodiment, a pushrod 44 is connected between the translation member 36 and a respective actuator 34. The pushrod 44 extends substantially in the longitudinal direction and is fixed with respect to the translation member 36, such that actuating the actuator 34 moves the pushrod 44 and the translation member 36 in the longitudinal direction.

The first end 40 and the second end 42 of the control link 38 include a respective first ball link 46 coupled to the translation member 36 and second ball link 48 coupled to the control surface member 30. The first ball link 46 allows the control link 38 to rotate with respect to the translation member 36 with three degrees of freedom and the second ball link 48 permits the control link 38 to rotate with respect to the control surface member 30 with three degrees of freedom as well. In this embodiment, when the tail fin sub-assembly 20 and the control surface linkage 32 are in the deployed configuration, the control link 38 is substantially parallel to the longitudinal direction, and is aligned with the pushrod 44 and the translation member 36. As a result, actuating the actuator 34 causes the pushrod 44, the translation member 36, and the control link 38 to all move in the longitudinal direction in unison.

As discussed above, the second end 42 of the control link 38 is rotatably coupled to the control surface member 30 via the second ball link 48. The control surface member 30 includes a control surface 50 that is rotatable with respect to the fin 28, and an arm 52 that is fixed with respect to the control surface 50. The second ball link 48 of the control link 38 is rotatably coupled to the arm 52 such that moving the control link 38 in the longitudinal direction causes the arm 52 to rotate the control surface 50 with respect to the fin 28 about an axis substantially parallel to the fin 28 when the fin 28 is in the deployed configuration. As a result, when the fin 28 is in the deployed configuration, the actuator 34 is able to move the pushrod 44, the translation member 36, and the control link 38 in unison in the longitudinal direction to cause the arm 52 to rotate the control surface 50 with respect to the fin 28. In this embodiment, moving the pushrod 44, the translation member 36, and the control link 38 forward with respect to the fuselage 16 causes the control surface 30 to rotate down with respect to the fin 28, and moving the pushrod 44, the translation member 36, and the control link 38 rearward with respect to the fuselage 16 causes the control surface 30 to rotate up with respect to the fin 28. It should be understood, however, that other functional arrangements are contemplated.

In this manner, the actuator 34 can be disposed in an interior 54 of the fuselage 16 while retaining the ability to control the control surface member 30 of the rotatable fin 28. The actuator 34 includes a motor 60, such as a servo or a stepper motor for example, and a rotatable actuator arm 62 connected to the pushrod 44. As the actuator arm 62 rotates, the pushrod 44 moves forward or rearward substantially in the longitudinal direction, thereby moving the translation member 36 in the longitudinal direction as well. In this embodiment, the translation member 36 includes a protrusion 56 that slideably engages a slot 58 (See FIG. 2B) disposed in the interior of the fuselage 54. The translation member 36 is also slideably mounted about a guide rod 64 that extends parallel to the slot 58 and is fixed with respect to the fuselage 16. The slot 58 and the guide rod 64 both extend in the longitudinal direction and cause the translation member 36 to translate substantially in the longitudinal direction along the slot 58 when the actuator 34 actuates the pushrod 44 forward or rearward.

During operation of the UAV 10, each tail fin sub-assembly 20 is biased toward the deployed configuration by a respective tension spring 66. Each spring 66 is connected between a fuselage 16 spring pin 68 fixed to the interior 54 of the fuselage 16 and a fin spring pin 70 fixed to the fin 28. In this embodiment, the fin 28 has a circular recess 72 formed therein which matingly engages a gasket 74 coupled to the fuselage 16. The gasket 74 retains the fin 28 with respect to the fuselage 16 while permitting the fin 28 to rotate with respect to the fuselage 16 between the stowed and deployed configurations. In this embodiment, the fuselage 16 has a pair of fuselage stops 76 configured to engage and retain a complementary fin stop 78 on each fin 28 when the fin 28 is in the deployed configuration. In this manner, the spring 66 retains the fin 28 in the deployed configuration by biasing the fin 28 to engage the fin stop 78 with the respective fuselage stop 76.

Figure 3A:
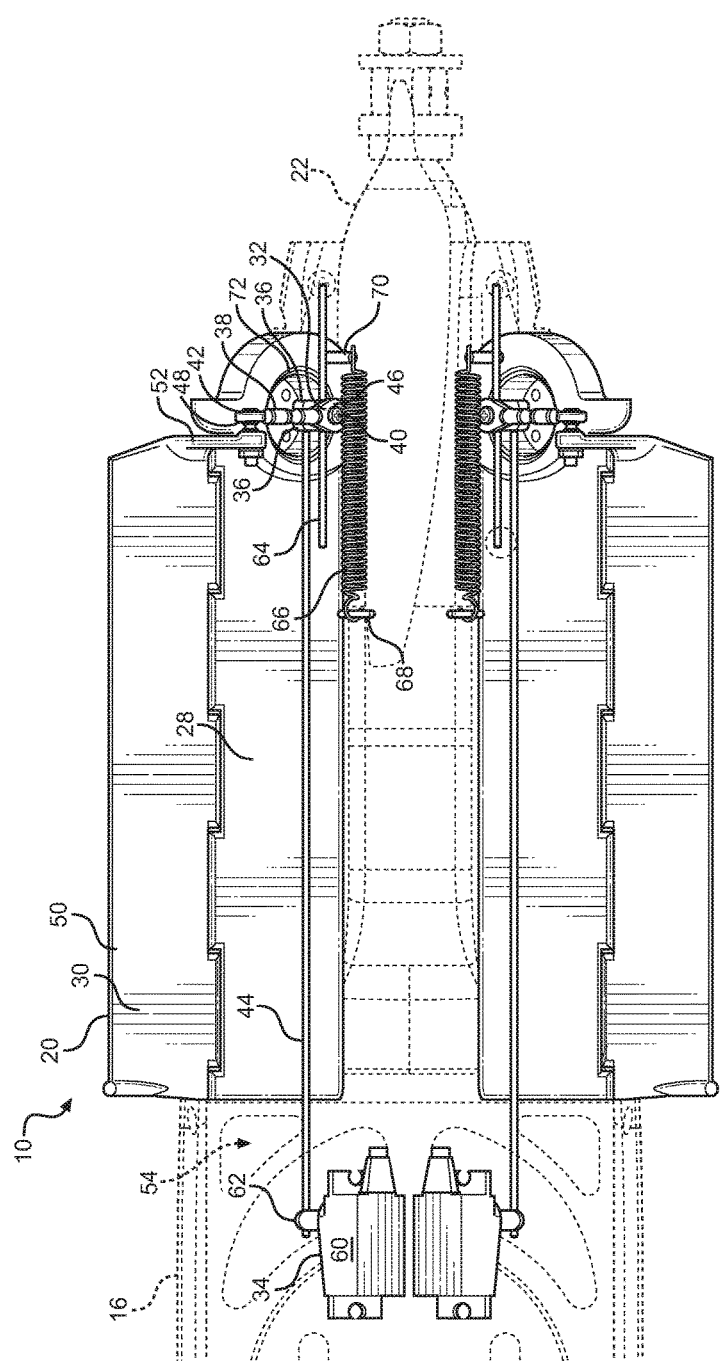
FIGS. 3A-3C illustrate internal components of the UAV of FIGS. 1A-2C in the stowed configuration, to illustrate operation of tail fin sub-assemblies of the UAV when stowed.
Figure 3B:
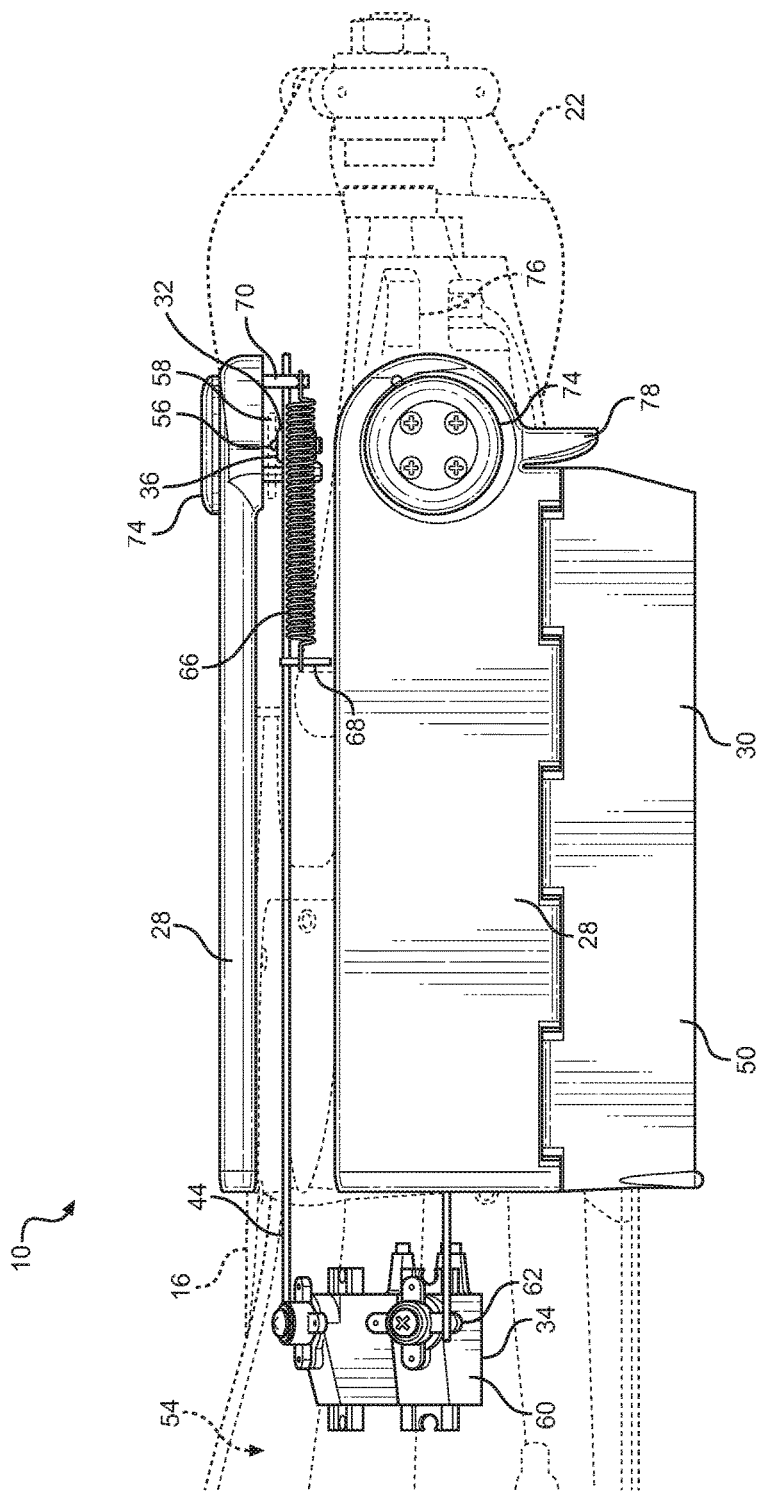
Figure 3C:
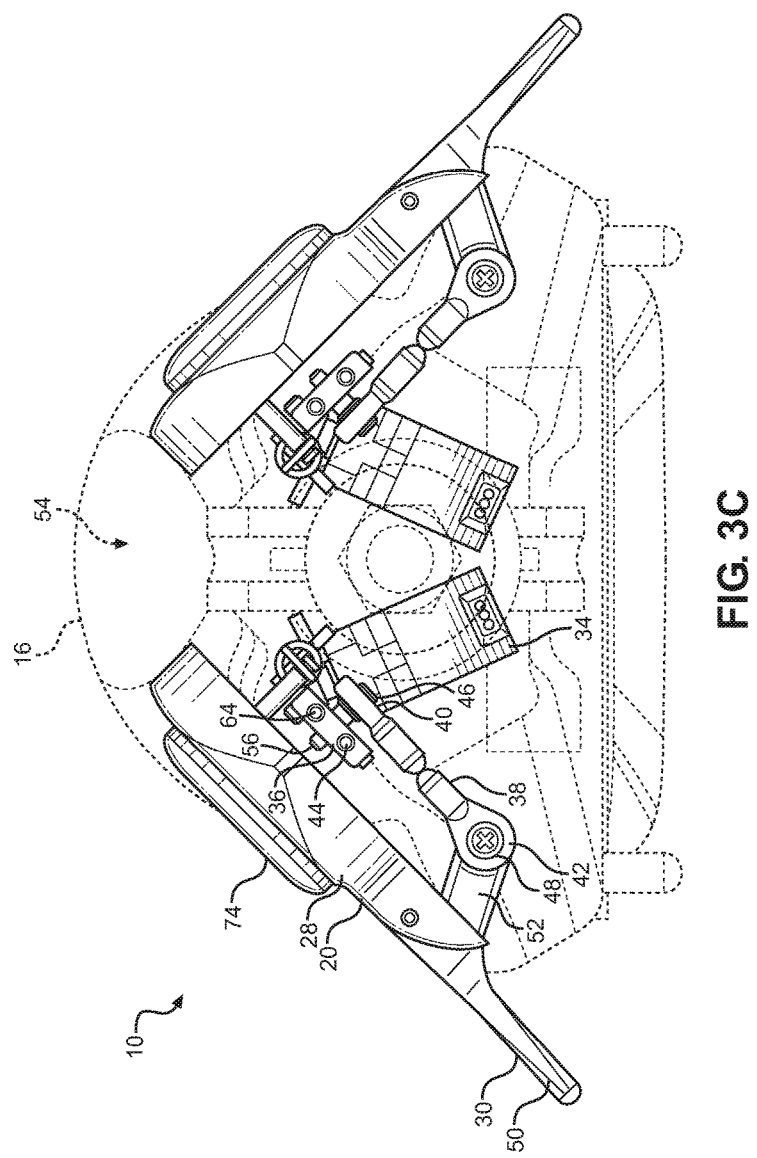

Having described the operation of the control surface linkage 32 when the tail fin sub-assembly 20 is in the deployed configuration, the arrangement and operation of the control surface linkage 32 when the tail fin sub-assembly 20 is in the stowed configuration will now be described with respect to FIGS. 3A-3C. In particular, FIGS. 3A-3C illustrate the same components of UAV 10 described above with respect to FIGS. 2A-2C, but in the stowed configuration. As shown by FIGS. 3A-3C, each fin 28 is rotated with respect to the fuselage 16 so as to be relatively flush and parallel with the fuselage 16. This permits the UAV 10 to be inserted into a storage receptacle, such as, for example, the storage and launch tube 14 described above with respect to FIG. 1A. Referring now to FIG. 3A, it can be seen that rotating the fin 28 causes the fin spring pin 70 to move away from the fuselage 16 spring pin 68, thereby extending and increasing tension in the spring 66. When the fin 28 is released, for example by being launched out of the storage and launch tube 14, the added tension in the spring 66 causes the fin 28 to quickly rotate back into the deployed configuration.

The control link 38 rotates with the fin 28 when the fin 28 is rotated to the stowed configuration. The control link 38 rotates about the first ball link 46 coupled to the translation member 36 at the first end 40 of the control link 38. When the translation member 36 is in a neutral position, the control link 38 is at a normal to the longitudinal direction. However, unlike in the deployed configuration, moving the translation member 36 in the stowed configuration, for example in response to actuating the actuator 34, will cause the control surface linkage 32 to move with respect to the fin 28 without rotating the control surface member 30. In this embodiment, actuating the actuator 34 instead causes the translation member 36 to rotate the control link 38 about the second ball link 48 coupled to the arm 52 of the control surface member 30 at the second end 42 of the control link 38. In this embodiment, the control link 38 rotates through an arc that includes the normal to the longitudinal direction. The movement characteristics of the control link 38 will be described below in greater detail with respect to FIGS. 6A and 6B.

Figure 4:
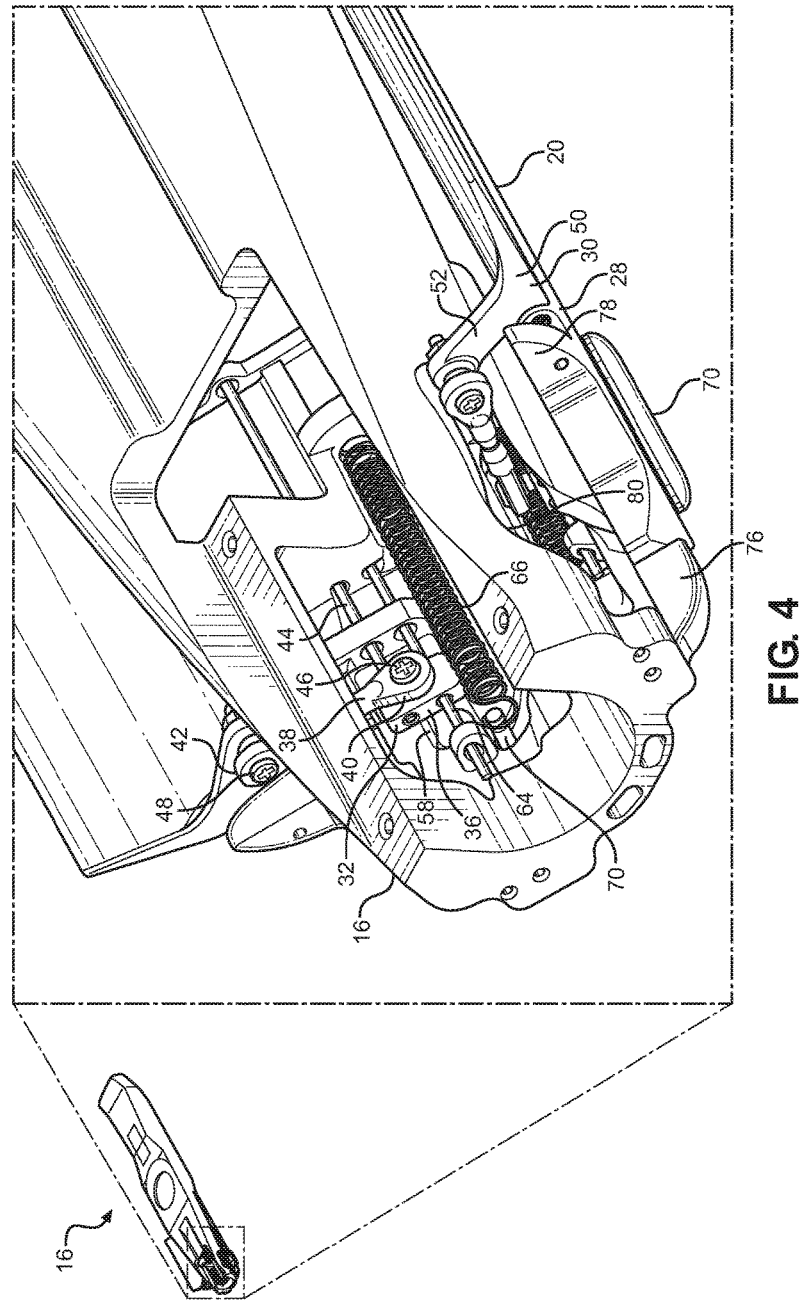
FIG. 4 illustrates a detail view of a portion of an inverted perspective view of the UAV according to the embodiment of FIGS. 1A-3C in the stowed configuration.

Referring now to FIG. 4, a detail view of a portion of an inverted perspective view of the UAV 10 according to the embodiment of FIGS. 2A-3C in the stowed configuration is illustrated. This view includes a cutaway of the fuselage 16 to show elements of the control surface linkage 32, including the translation member 36, the pushrod 44, and the control link 38. The fuselage 16 includes a slot 80 that allows the control link 38 to extend from the translation member 36 in the interior 54 of the fuselage 16 at the first end 40 to the arm 52 of the control surface member 30 at the second end 42. The slot 80 also permits the control link 38 to rotate with the control surface member 30 as the fin 28 is rotated with respect to the fuselage 16 between the stowed configuration and the deployed configuration.

Figure 5:
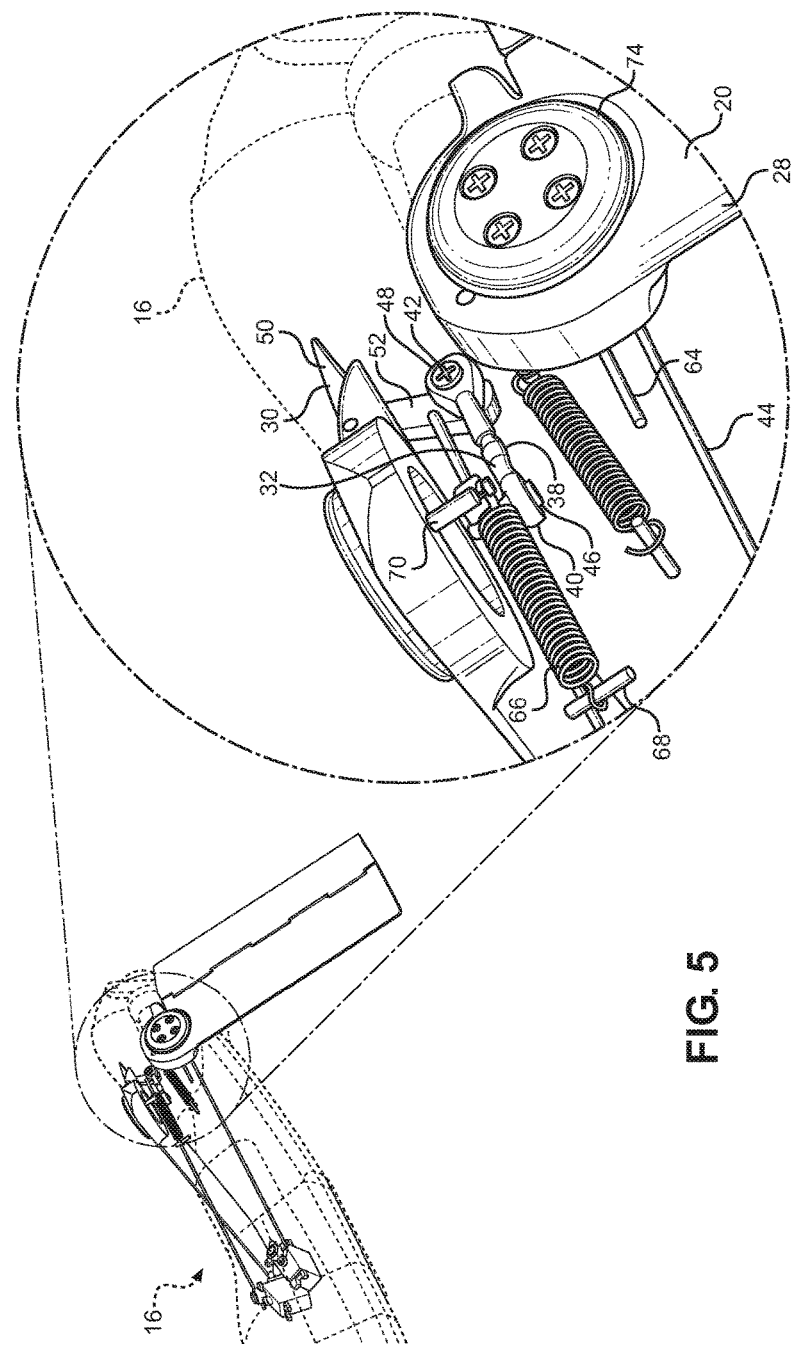
FIG. 5 illustrates a detail view of a portion of a perspective view of the UAV according to the embodiment of FIGS. 1A-4 in the deployed configuration.

In this regard, FIG. 5 is a detail view of a portion of a perspective view of the UAV 10 in the deployed configuration. As was described in detail above with respect to FIGS. 2A-2B, the control link 38 is substantially parallel with the longitudinal direction when the control surface member 30 is in the deployed configuration, thereby permitting the pushrod 44, the translation member 36, and the control link 38 to be actuated in unison to rotate the control surface member 30 with respect to the fin 28.

Figure 6A:
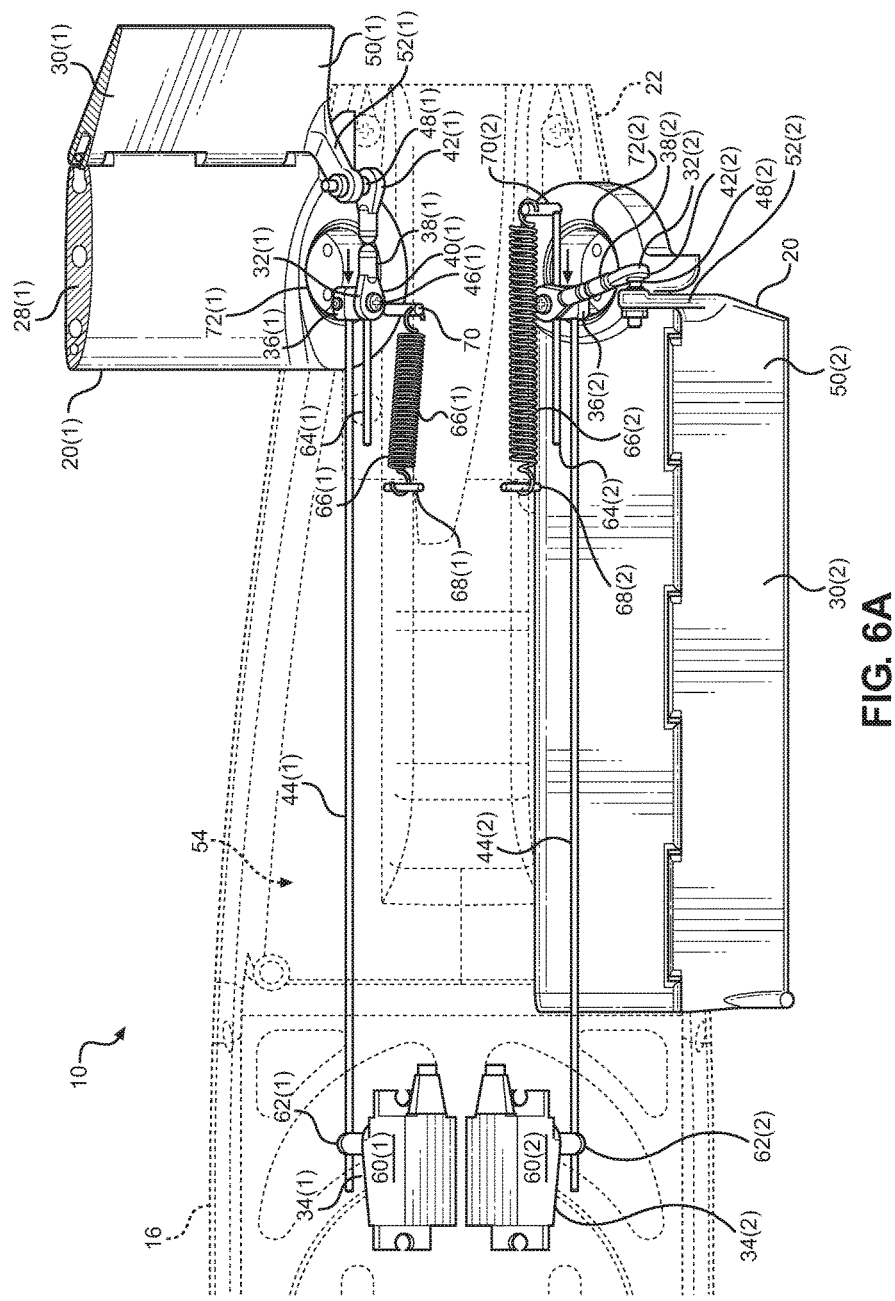

To further illustrate the movement and operation of the control link 38 in the stowed and deployed configurations, FIGS. 6A and 6B illustrate bottom cutaway views of the UAV 10, with the left fin 28(1) in the deployed configuration and the right fin 28(2) in the stowed configuration. For convenience, elements corresponding to the left side of the UAV 10 include a (1) designation below, and elements corresponding to the right side of the UAV 10 include a (2) designation below. In all other respects, the elements of FIGS. 6A and 6B correspond to elements discussed above with respect to FIGS. 1A-5.

In FIG. 6A, the left actuator 34(1) pulls the left pushrod 44(1) forward, thereby moving the left translation member 36(1) forward in the longitudinal direction. The left control link 38(1) is substantially parallel with the longitudinal direction because the left fin 28(1) is in the deployed configuration. As a result, the forward movement of the left control link 38(1) pulls the left arm 52(1) forward and causes the left control surface 50(1) of the left control surface member 30(1) to rotate downwardly with respect to the left fin 28(1).

In contrast, the right fin 28(2) of FIG. 6A is in the stowed configuration. Here, when the right actuator 34(2) causes the right translation member 36(2) to move forward, the right control link 38(2) rotates forward about the second ball link 48(2) coupled to the right arm 52(2) of the right control surface member 30(2) at the second end 42(2). In this embodiment, the first ball link 46(2) and second ball link 48(2) allow the control link 38 to rotate and twist with respect to the translation member 36(2) and arm 52(2) as needed when the fin 28(2) is in the stowed configuration, regardless of whether the translation member 36(2) is moved forward with respect to the fuselage 16.

Similarly, FIG. 6B illustrates movement and operation of the control link 38 in the stowed and deployed configurations when the translation members 36 are moved rearward by the actuators 34. Here again, because the left control link 38(1) is substantially parallel with the longitudinal direction when the left fin 28(1) is in the deployed configuration, movement of the left translation member 36(1) rearward causes the left control link 38(1) to push the left arm 52(1) rearward and causes the left control surface 50 of the left control surface member 30(1) to rotate upwardly with respect to left the fin 28(1). In contrast, when the right actuator 34(2) causes the right translation member 36(2) to move rearward, the right control link 38(2) rotates rearward about the right second ball link 48(2) coupled to the right arm 52(2) of the right control surface member 30(2) at the right second end 42(2), without moving the right control surface member 30(2) or causing any stress or damage to the right first ball joint 46(2), the second ball joint 48(2), or any other part of the right control surface linkage 32(2).

In the above embodiments, the translation member 36 is entirely disposed in the interior 54 of the fuselage 16, and the control link 38 is partially disposed in the interior 54 of the fuselage 16. One advantage of this arrangement is that, by disposing as many components as possible in the interior 54 of the fuselage 16, the UAV 10 can have fewer protuberances into the airstream around the UAV 10 during flight, thereby improving the aerodynamic profile and flight characteristics of the UAV 10. In other embodiments, however, space constraints may nevertheless require that additional components be disposed outside the aircraft.

Figure 7:
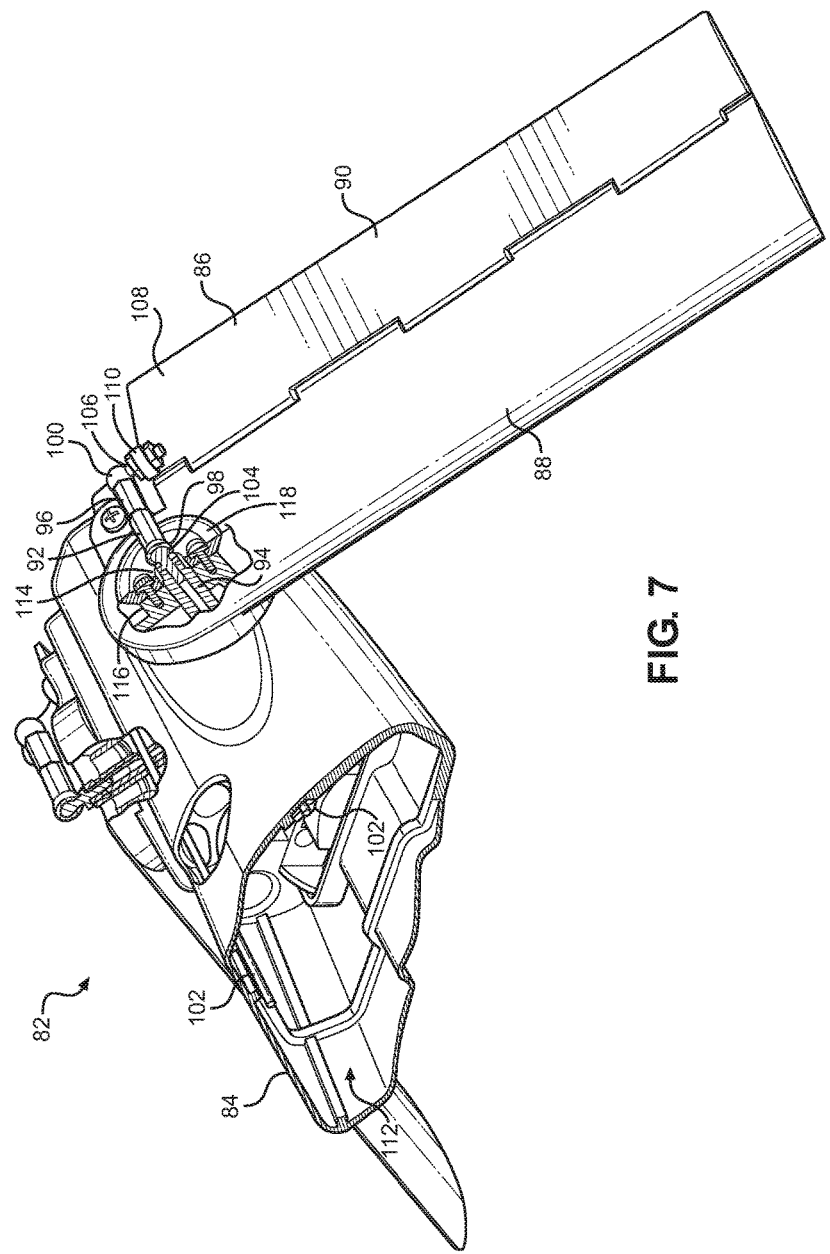
FIG. 7 illustrates a partial cutaway view of a UAV according to an alternate embodiment, with portions of a control surface linkage disposed outside the fuselage of the UAV.

In this regard, FIG. 7 illustrates partial cutaway view of a UAV 82 according to an alternate embodiment. In this embodiment, the UAV 82 includes a fuselage 84 having an alternative tail fin sub-assembly 86. The tail fin sub-assembly 86 includes a fin 88 rotatable about the fuselage 84 and a control surface member 90 rotatable about the fin 88. The UAV 82 also includes an alternate control surface linkage 92 having a translation member 94 extending through the fuselage 84 and a control link 96 rotatably coupled between the translation member 94 at a first end 98 and the control surface member 90 at the second end 100, with the entire control link 96 disposed outside the fuselage 84.

A pushrod 102 coupled to an actuator (not shown) moves the translation member 94, which causes the control link 96 to move the control surface member 90 via first ball link 104 and second ball link 106. The control surface member 90 includes a control surface 108 and arm 110 fixed with respect to the control surface 108 and rotatably coupled to the second ball link 106. In this embodiment, the pushrod 102 moves the translation member 94 along the longitudinal direction within a slot 114 that is fixed with respect to the fuselage 84, thereby causing the control link 96 to control the control surface member 90 when the fin 88 is in the deployed configuration and to move with respect to the control surface member 90 without moving the control surface member 90 when the fin 88 is in the stowed configuration (not shown). In this embodiment, each fin 88 has a circular recess 116 formed therein which matingly engages a gasket 118 coupled to the fuselage 84. The gasket 118 retains the fin 88 with respect to the fuselage 84 while permitting the fin 88 to rotate with respect to the fuselage 84 between the stowed and deployed configurations. In this embodiment, the slot 114 is formed in the gasket 118, thereby permitting the translation member 94 to move in the longitudinal direction along the slot 114, thereby permitting full movement of the control surface member 90 when the fin 88 is in the deployed configuration while minimizing movement of the control surface member 90 when the fin 88 is in the stowed configuration.

Inventors have determined that a small missile with a narrow airfoil profile can fit within a launch tube 14. However this missile configuration utilizes a folding wing design. Hence, an external control surface linkage mechanism limits the configurations of a folding wing design as external linkage mechanisms may become damaged during unfolding and deployment of the wing sub-assembly. Hence, the inventors have determined that a control surface linkage mechanism may be configured to fit within the bounds of a wing's airfoil body of a UAV 10 (FIG. 1A-1C). In some embodiments, the UAV or aircraft may have stationary wings with control surface, such that the wings do not rotate or fold from a stowed position.

In some embodiments, a compact internal wing control surface linkage system is provided to fit within an airfoil body where the desired actuator's thinnest dimension nearly matches the airfoil maximum thickness.

Figure 8A:
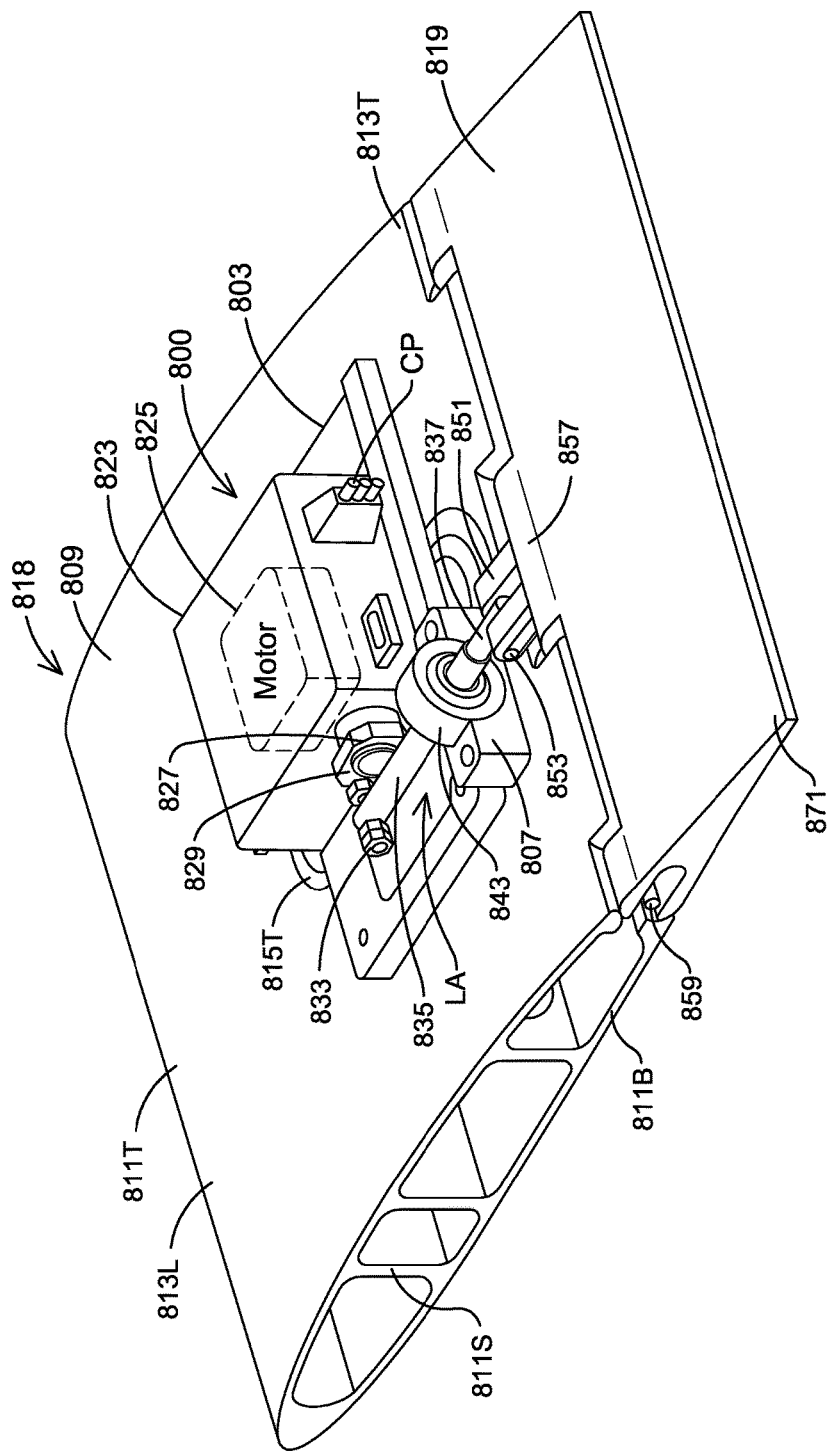
FIG. 8A illustrates a top view of an internal wing control surface linkage system embedded in a wing sub-assembly shown in phantom.
Figure 8B:
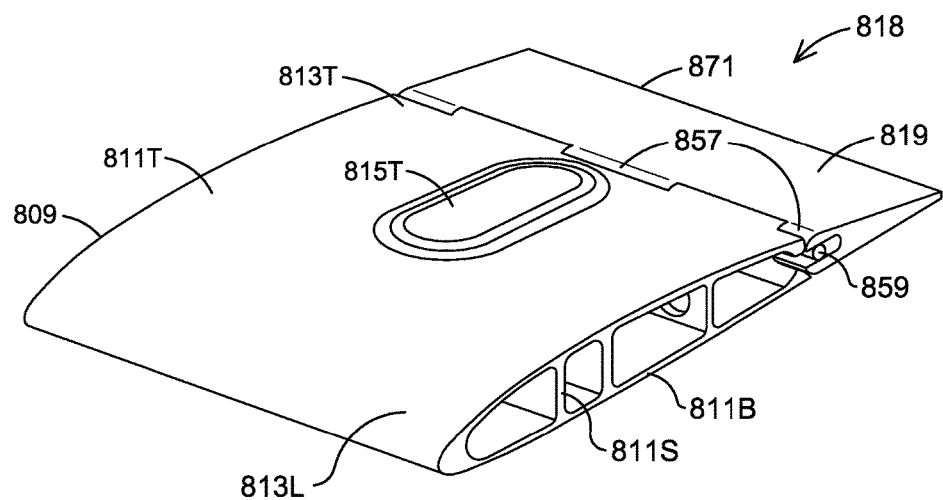
FIG. 8B illustrates a top view of the wing sub-assembly.

Referring now to FIG. 8A, a top view of an internal wing control surface linkage (IWCSL) system 800 embedded in a wing sub-assembly 818 shown in phantom is illustrated. Referring also to FIG. 8B, a top view of the wing sub-assembly 818 is illustrated. In operation, the internal wing control surface linkage system 800, concealed from view, may be configured to pivot the wing's control surface 819 coupled to a trailing edge of the wing sub-assembly 818 so that a tip 871 of the control surface 819 is deflected.

The wing sub-assembly 818 may have a narrow airfoil body 809 having a top surface 811T and a bottom surface 811B. The airfoil body 809 may include structures such as ribs and supports 811S. The airfoil body 809 includes a leading edge 813L and a trailing edge 813T to which the wing's control surface 819 is hingedly coupled.

A first fairing 815T is formed on the top surface 811T of the airfoil body 809. The fairing 815T has an area which has a slight elevation, as best seen in FIG. 12A) above the primary elevation of the top surface 811T of the airfoil body 809. The fairing 815T is a raised island in the top surface 811T, the raised island location expanding the narrow airfoil area profile to accommodate the internal wing control surface linkage system 800. In some embodiments, the airfoil body 809 may include a second fairing 815B (FIG. 9) which may be aligned with the first fairing 815T on the top surface 811T of the airfoil body 809. The second fairing 815B (FIG. 9) is positioned on a bottom side of the airfoil body 809, as will be discussed in relation to FIG. 9.

Figure 10:
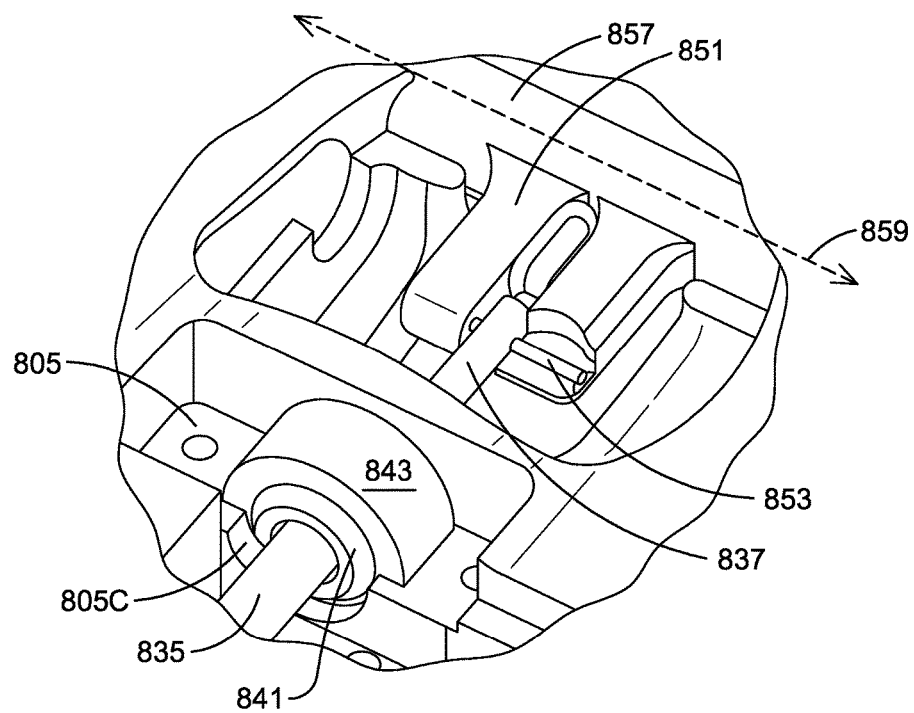
FIG. 10 illustrates a partial view D of an internal wing control surface linkage system of FIG. 9.
Figure 9:
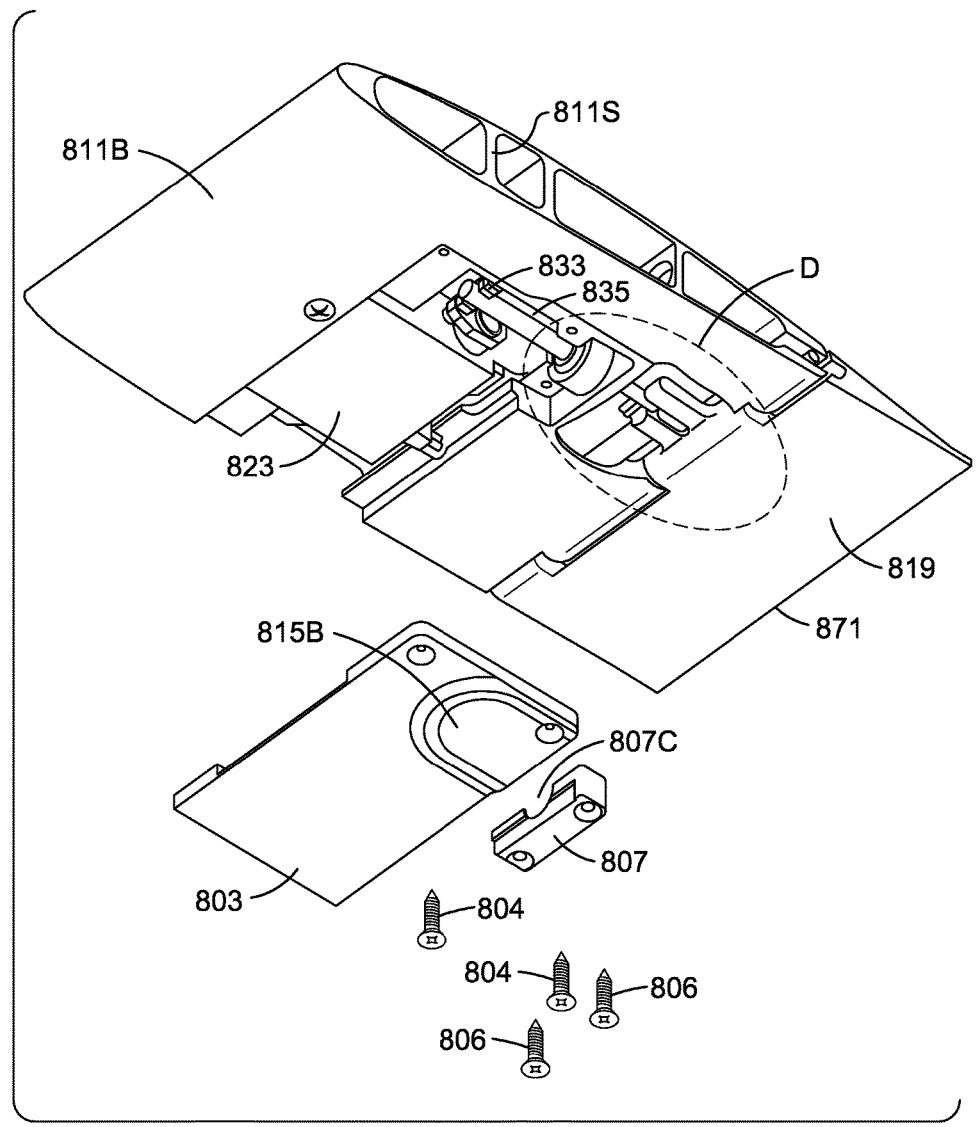
FIG. 9 illustrates a bottom (underside) view of the internal wing control surface linkage system of FIG. 8A with the base plate and saddle block cover removed.

The IWCSL system 800 may comprise a base plate 803 and an actuator 823 may be mounted to the airfoil body 809. Referring also to FIG. 9, a bottom (underside) view of the internal wing control surface linkage system 800 of FIG. 8A with the base plate 803 and saddle block cover 807 removed is depicted. FIG. 10 illustrates a partial view D of an internal wing control surface linkage system of FIG. 9. As can be seen, the airfoil body 809 includes an opening in the bottom surface 811B. The opening provides access to the interior of the airfoil body 809 for the installation of the IWCSL system 800 within a cavity of the airfoil body 809. In an embodiment, the second fairing 8158 is formed in the base plate 803 and creates a blister in the exterior surface of the base plate 803.

The base plate 803 is configured to be secure to the airfoil body 809 via at least one fastener 804. In some embodiments, the fastener 804 includes screws or bolts. However, in lieu of a removable fastener 804, the base plate 803 may be fixedly secured to the airfoil body via a welding seam or other fastening mechanisms.

The IWCSL 800 may include a bearing saddle block 805 (FIG. 10) coupled to or integral with the top surface 811T of the airfoil body 809 and a saddle block cover 807. In some embodiments, the base plate 803 and the bearing saddle block cover 807 may be integrally formed together into a unitary unit. In some embodiments, the saddle block cover 807 may be separate from the base plate 803. The saddle block 805 may have a cradle which has a concaved surface 805C (FIG. 10). The saddle block cover 807 may have a concaved surface 807C (FIG. 9) wherein the installation of the saddle block cover 807 over the saddle block 805 (FIG. 10) may be attached via fasteners 806 to secure in place a collar 843.

The actuator 823 may include a servo motor 825. The actuator 823 includes a plurality of connector pins CP configured to receive control signals to control the operation of the servo motor 825 which in turn causes a linking arm LA to pivot the control surface 819 by a certain amount of deflection.

The actuator 823 may include main rotation hub 827. The main rotation hub 827 may be configured to be rotated by the servo motor 825 about a center axis of rotation $CA_1$ (FIG. 11) as will be described in more detail later. The main rotation hub 827 may include a center axis of rotation $CA_1$ to which an arm coupler 829 is attached. The main rotation hub 827 includes an arm coupler 829 fixedly coupled around center axis of rotation $CA_1$ of the main rotation hub 827. The arm coupler 829 having an offset coupling tab 831 wherein the arm coupler 829 and coupling tab 831 being an actuator arm.

The linking arm LA of the IWCSL system 800 of may comprise a linkage tube 835 having a generally hollow cylindrical shape with a longitudinal axis and first circumference. The linkage tube 835 is coupled to the offset coupling tab 831 (actuator arm) via a fastener 833 at a first end. The fastener 833 may include a pin. The pinned first end of the linkage tube 835 will sometimes be referred to as a hinged end of the linkage tube 835. A small hole (not shown) may be drilled laterally through the linkage tube 835 to which fastener 833 is coupled to provide a pivot point between the offset coupling tab 831 (actuator arm) and the linkage tube 835.

In an embodiment, fastener 833 passes through the linking tube 835 perpendicular to the longitudinal axis of the linkage tube 835 and attaches to the offset coupling tab 831 (actuator arm) of the main rotation hub 827. When the main rotation hub 827 rotates a certain amount of degrees, the linkage tube 835 moves essentially the same corresponding amount of degrees and, simultaneously pivots about fastener 833, as will be described in more detail in relation to FIGS. 12A-12C.

The IWCSL system 800 may comprise a linkage rod 837 having a generally cylindrical shape with a longitudinal axis and a second circumference wherein the first circumference is larger than the second circumference. The linkage rod 837 is slideably coupled within the hollow interior of the linkage tube 835, wherein during rotation of the linkage tube 835 about the arm coupler 829, the linkage rod 837 slides in and out of the linkage tube 835. The linkage tube 835 and the linkage rod 837 together form a linking arm LA which has a variable length according to the angle of rotation about the arm coupler 829 (actuator arm).

The linkage tube 835 and the linkage rod 837 may have the same longitudinal axis. A first end of the linkage rod 837 is slideably coupled within the linkage tube 835. The other free end (second end) of the linkage rod 837 has a through hole formed therein which is perpendicular to the rod's longitudinal axis for the attachment of a clevis pin 853. The second end sometimes is referred to as a hinged end of the linkage rod 837.

The IWCSL system 800 may comprise a spherical bearing 841 nested within a collar 843 wherein the linkage tube 835 is configured to slide, along its longitudinal axis within and through the hollow center of the spherical bearing 841. The linkage tube 835 being concentric to the linkage rod 837. The spherical bearing 841 may be saddled in the saddle block 805 and saddle block cover 807.

The IWCSL system 800 may comprise a clevis 851 having the clevis pin 853. The clevis 851 may be coupled to the control surface 819 but lies within the airfoil body 809. The clevis pin 853 may be coupled in the through hole of the linkage rod 837 at the second end. The second end of the linking rod 837 may sometimes be referred to as a hinged end. The wing's control surface 819 includes at least one control surface hinge 857 having a control surface hinge pin 859, the at least one control surface hinge 857 has a rotational axis which allows the control surface 819 to pivot and cause the movement or deflection of the tip 871 of the control surface 819.

In operation, the rotational axis of the linking arm LA lies parallel to the rotational axis of the control surface hinge 857. Likewise, the center axis of rotation $CA_1$ of the hub 827 is parallel to the rotational axis of the linking arm LA about fastener 833 and the rotational axis of the control surface hinge 857. Likewise, the linkage rod 837 rotation of axis about clevis pin 853 is parallel to the center axis of rotation $CA_1$ of the hub 827, the rotational axis of the control surface hinge 857 and the rotational axis of the linking arm LA about fastener 833.

The linkage tube 835 slides within the spherical bearing 841, the spherical bearing 841 rests in the concaved surface 805C of the saddle block 805 embedded in the airfoil body 809. The linkage rod 837 slides within the linkage tube 835 and, via a small hole drilled on the hinged end of rod 837, connects to the control surface clevis 851 by a clevis pin 853. The clevis pin 853 provides a second pivot axis.

Figure 11:
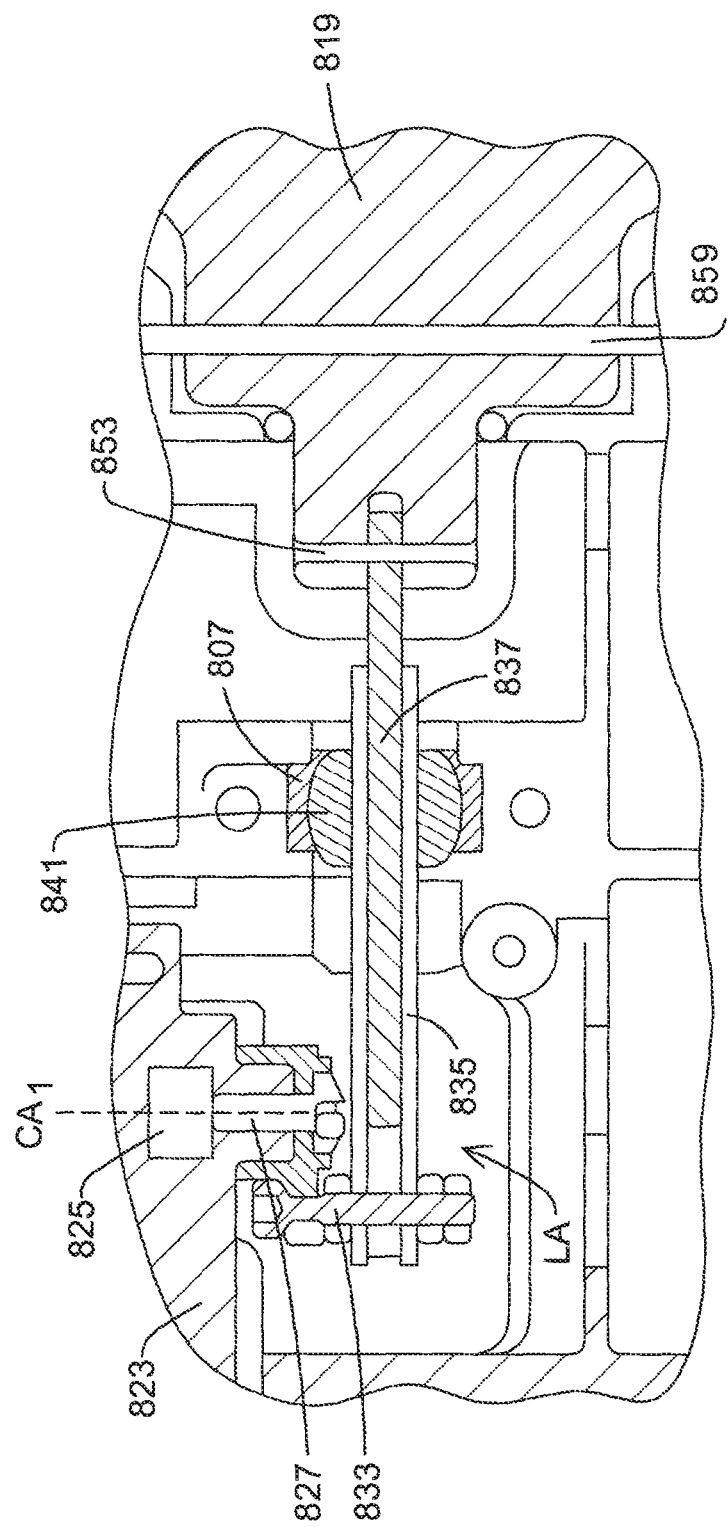
FIG. 11 illustrates a top view of the internal wing control surface linkage system with a portion of the top surface of the airfoil body removed.

Referring also to FIG. 11, a top view of the internal wing control surface linkage system with a portion of the top surface of the airfoil body removed is shown. Deflection of the control surface 819 relative to an airfoil body 809 is achieved, via a spherical bearing 841 providing a fixed pivot (pivotally constrained in the saddle block) which pivots or swivels the linking tube 835 and rod 837 in unison, as the linking tube 835 simultaneously slides within the spherical bearing 841; and, in combination, while the rod 837 which simultaneously, slides within the linking tube 835 allows rotational freedom of motion at the moving pivots of the respective the arm coupler 829 and clevis 851. The arm coupler 829 (actuator arm) provides a first pivot axis by the pin of fastener 833. The clevis pin providing a second pivot axis. The first pivot axis and the second pivot axis is parallel the center axis of rotation $CA_1$. The control surface hinge 857 includes a third pivot axis about hinge pin 859. The third pivot axis is parallel to the first pivot axis, second pivot axis and the center axis of rotation $CA_1$.

The spherical bearing 841 in combination with the sliding linkage arm LA (linkage tube 835 and rod 837) may provide a bind-free and misalignment tolerant linking mechanism. The embodiments may reduce aerodynamic drag as opposed to the traditional exposed linkage mechanisms without the need to increase the overall airfoil body profile. Specifically, drag is reduced by keeping all elements of the actuator and linkages within the airfoil. Utilizing the IWCSL system 800 in a UAV 10 improves packaging for a stowed wing sub-assembly which is not possible with external linkages. The IWCSL system 800 has application in other UAVs where the concealed IWCSL system 800 may assist in reducing drag.

The operation of the IWCSL system 800 will be described in more detail in relation of FIGS. 12A-12C. FIG. 12A illustrates a cross sectional view of the wing sub-assembly 818 with the IWCSL system 800 installed in the airfoil body 809 and with the tip 871 of the wing's control surface 819 at 0°. FIG. 12B illustrates a cross sectional view of the wing sub-assembly with the IWCSL system 800 installed in the airfoil body 809 and with the tip 871 of the wing's control surface deflected upward. FIG. 12C illustrates a cross sectional view of the wing sub-assembly 819 with the IWCSL system 800 installed in the airfoil body 809 and with the tip 871 of the wing's control surface 819 deflected downward.

In FIG. 12A, the rotation axis of the linking tube 835 about fastener 833 and the hinged end of the rod 837 connected to the clevis pin 853 are generally arranged in a straight line or plane with 0° slope (first slope). In other words, the hinged end (at fastener 833) of linking tube 835 and the hinged end (via pin 853) of the rod 837 are aligned or oriented to be generally at the same elevation. The elevation of the hinged end of the linking tube 835 is not tilted with respect to the hinged end of the rod 837.

In FIG. 12B, rotation axis of the linking tube 835 about fastener 833 and the hinged end of the rod 837 connected to the clevis pin 853 are generally arranged in a straight line but canted at an angle or sloped about the fixed pivot or swivel of the spherical bearing 841. The hinged end of the linking tube 835 (by rotation of the actuator arm about the center axis of rotation) is pivoted upward toward a top surface 811T of the airfoil body 809 which causes the hinged end of the rod 837 to be oriented downward toward a bottom surface 811B (or base plate 803) of the airfoil body 809. The movement of the rod 837 causes the clevis 851 to follow downward toward the bottom surface 811B. As the clevis 851 follows the rod 837, the control surface 819 is pivoted about hinge pin 859 causing deflection of the tip 871 in the upward direction.

The hinged end of the linking tube 835 forms an obtuse angle with the wing's control surface 819. Hence the hinged end of the linking tube 835 and tip 871 of the control surface 819 are oriented upward in the direction of the top surface 811T of the airfoil body 809. The wing's control surface 819 is configured to have a range of rotation upward from 0° of deflection along intermediate pivoted locations to a maximum degree of rotation for which the wing's control surface 819 is designed.

In FIG. 12B, the spherical bearing 841 is shown in a swivel position which allows the linking tube 835 to cant at an angle which orients the hinged end of the linkage rod 837 downward at a second slope. Deflection of the control surface 819 relative to the airfoil body 809 is achieved via the spherical bearing 841 acting as a fixed pivot or swivel. Sliding motion of the linkage tube 835 within the spherical bearing 841 and sliding motion of the linkage rod 837 within the linkage tube 835 allows rotational freedom of motion at the moving pivots of the respective offset coupling tab 831 and clevis 851 to deflect the control surface 819 upward. The linkage rod 837 pivots relative to the clevis 851 via the clevis pin 853.

In FIG. 12C, rotation axis of the linking tube 835 about fastener 833 and the hinged end of the rod 837 connected to the clevis pin 853 are generally arranged in a straight line but canted at an angle about the fixed pivot of the spherical bearing 841 at a third slope. The third slope is opposite the second slope of FIG. 12B. The hinged end of the linking tube 835 is pivoted downward (by rotation of the actuator arm about the center of rotation) toward bottom surface 811B (or base plate 803) of the airfoil body 809 which causes the hinged end of the rod 837 to be oriented upward toward a top surface 811T of the airfoil body 809. The movement of the rod 837 causes the clevis 851 to follow upward toward the top surface 811T. As the clevis 851 follows the rod 837, the control surface 819 is pivoted about hinge pin 859 causing deflection of the tip 871 in the downward direction. The linkage rod 837 pivots relative to the clevis 851 via the clevis pin 853.

The hinged end of the linking tube 835 forms an obtuse angle with the wing's control surface 819. Hence the hinged end of the linking tube 835 and tip of the control surface 819 are oriented downward in the direction of the bottom surface 811B of the airfoil body 809. The wing's control surface 819 is configured to have a range of rotation downward from 0° of deflection along intermediate pivoted locations to a maximum degree of rotation for which the wing's control surface 819 is designed.

In FIG. 12C, the spherical bearing 841 is shown in a swivel position which allows the linking tube 835 to cant at an angle which orients the hinged end of the linkage rod 837 upward. Deflection of the control surface 819 relative to the airfoil body 809 is achieved via the spherical bearing 841 acting as a fixed pivot or swivel. Sliding motion of the linkage tube 835 within the spherical bearing 841 and sliding motion of the linkage rod 837 within the linkage tube 835 allows rotational freedom of motion at the moving pivots of the respective offset coupling tab 831 and clevis 851 to deflect the control surface 819 downward.

In FIGS. 12A-12C, the top fairing 815T provides clearance in the top surface 811T of the airfoil body 809 to accommodate the hinged end of the linking tube 835. Likewise, bottom fairing 815B in the bottom surface (or base plate 803) of the airfoil body 809 provides clearance in the bottom side of the airfoil body 809 to accommodate the hinged end of the linking tube 835. The top fairing 815T may include a thinning of the top surface 811T in the area A1 where the hinged end of the linking tube 835 would approach so that there is clearance when deflecting the control surface 819 upward, as best seen in FIG. 12B. Likewise, bottom fairing 815B may include a thinning of the base plate 803 in the area A2 where the hinged end of the linking tube 835 would approach so that there is clearance when deflecting the control surface 819 downward, as best seen in FIG. 12B.

The top fairing 815T may include a thinning of the airfoil top surface 811T in the area B1 where the hinged end of the linkage rod 837 would approach so that there is clearance when deflecting the control surface 819 downward, as best seen in FIG. 12C. Likewise, bottom fairing 815B may include a thinning of the air foil bottom surface 811B in the area B2 where the hinged end of the linkage rod 837 would approach so that there is clearance when deflecting the control surface 819 upward, as best seen in FIG. 12B.

Figure 13:
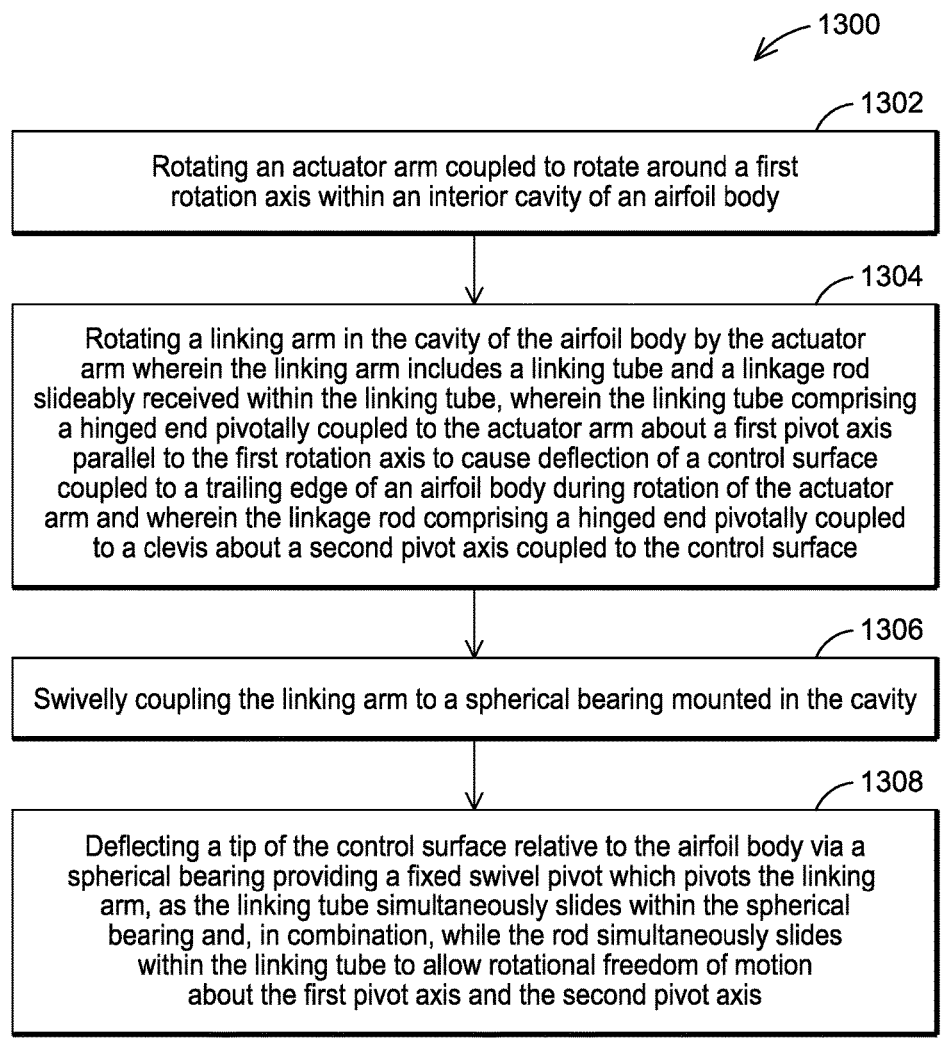
FIG. 13 illustrates a flowchart of a method for deflecting control surfaces of a wing.

FIG. 13 illustrates a flowchart of a method 1300 for deflecting control surfaces of a wing. The method 1300 may be performed in the order shown or in a different order. In some embodiments, blocks may be added or deleted. In some embodiments, one or more of the blocks may be performed contemporaneously.

The method 1300 comprises, at block 1302, rotating an actuator arm coupled to rotate around a first rotation axis within an interior cavity of an airfoil body 809. At block 1304, the method 1300 may include rotating a linking arm LA in the cavity of the airfoil body 309 by the actuator arm wherein the linking arm LA includes a linking tube 835 and a linkage rod 837 slideably received within the linking tube 835. The linking tube 835 comprises a hinged end pivotally coupled to the actuator arm about a first pivot axis parallel to the first rotation axis to cause deflection of a control surface 819 coupled to a trailing edge of an airfoil body 809 during rotation of the actuator arm. The linkage rod 837 comprises a hinged end pivotally coupled to a clevis about a second pivot axis coupled to the control surface. The method 1300 includes, at block 1306, swivelly coupling the linking arm LA to a spherical bearing 841 mounted in the cavity. The method 1300 comprises, at block 1308, deflecting a tip 871 of the control surface 819 relative to the airfoil body 809 via a spherical bearing 841 providing a fixed swivel pivot which pivots the linking arm LA, as the linking tube simultaneously slides within the spherical bearing 841 and, in combination, while the rod 837 simultaneously slides within the linking tube 835 to allow rotational freedom of motion about the first pivot axis and the second pivot axis.

Those skilled in the art will recognize improvements and modifications to the preferred embodiments of the disclosure. All such improvements and modifications are considered within the scope of the concepts disclosed herein and the claims that follow.

What is claimed is:

1. An internal wing control surface linkage system comprising:
    an actuator arm configured to rotate around a first rotation axis within a cavity of an airfoil body;
    a linking arm mountable within the cavity of the airfoil body, the linking arm having a linking tube and a linkage rod slideably received within the linking tube, wherein the linking tube comprising a hinged end pivotally coupled to the actuator arm about a first pivot axis parallel to the first rotation axis to cause deflection of a control surface coupled to a trailing edge of the airfoil body during rotation of the actuator arm and wherein the linkage rod comprising a hinged end pivotally coupled to a clevis about a second pivot axis coupled to the control surface; and
    a spherical bearing mountable in the cavity and swivelly coupling the linking arm wherein deflection of a tip of the control surface relative to the airfoil body is achieved, via the spherical bearing providing a fixed swivel pivot which swivels the linking arm, as the linking tube simultaneously slides within the spherical bearing and, in combination, while the rod simultaneously slides within the linking tube to allow rotational freedom of motion about the first pivot axis and the second pivot axis.

2. The system of claim 1, wherein the airfoil body comprises an opening in a bottom surface providing access into the cavity in the airfoil body; and
   further comprising a base plate having an actuator coupled thereto, the actuator comprising a motor coupled to a main rotation hub via the first rotation axis; and a saddle block cover providing a saddle block portion with a concaved surface for support of the spherical bearing, the opening closed by the base plate and the saddle block cover.

3. The system of claim 2, wherein the base plate comprises a bottom fairing for the clearance of the hinged end of the linking tube.

4. The system of claim 2, further comprising the airfoil body having a top surface, the airfoil body comprising a top fairing formed within the top surface of the airfoil body, the top fairing providing clearance of at least one of the hinged end of the linking tube and the hinged end of the linkage rod.

5. The system of claim 1, wherein the hinged end of the linking tube and the hinged end of the linkage rod are arranged in a first straight line with zero slope when the control surface has 0° deflection of the tip relative to the airfoil body.

6. The system of claim 5, wherein the hinged end of the linking tube and the hinged end of the linkage rod are arranged in a second straight line at a first slope when the tip is deflected upward relative to the airfoil body such that the control surface and the linking tube form an obtuse angle.

7. The system of claim 6, wherein the hinged end of the linking tube and the hinged end of the linkage rod are arranged in a third straight line at a second slope when the tip is deflected downward relative to the airfoil body wherein the control surface and the linking tube form an obtuse angle.

8. An unmanned aerial vehicle (UAV) comprising:
   a wing sub-assembly comprising an airfoil body having an interior cavity and a control surface with a clevis coupled to a trailing edge of the airfoil body and a tip; and
   an internal wing control surface linkage system comprising:
      an actuator arm coupled to rotate around a first rotation axis within the cavity of the airfoil body;
      a linking arm mounted in the cavity of the airfoil body, the linking arm having a linking tube and a linkage rod slideably received within the linking tube, wherein the linking tube comprising a hinged end pivotally coupled to the actuator arm about a first pivot axis parallel to the first rotation axis to cause deflection of the control surface during rotation of the actuator arm and wherein the linkage rod comprising a hinged end pivotally coupled to the clevis about a second pivot axis coupled to the control surface; and
      a spherical bearing cradled in the cavity and swivelly coupling the linking arm wherein deflection of a tip of the control surface relative to the airfoil body is achieved, via the spherical bearing providing a fixed swivel pivot which swivels the linking arm, as the linking tube simultaneously slides within the spherical bearing and, in combination, while the rod simultaneously slides within the linking tube to allow rotational freedom of motion about the first pivot axis and the second pivot axis.

9. The UAV of claim 8, wherein the airfoil body comprises an opening in a bottom surface providing access into the cavity in the airfoil body; and
   the internal wing control surface linkage system further comprising:
      a base plate having an actuator coupled thereto, the actuator comprising a motor coupled to a main rotation hub via the first rotation axis; and a saddle block cover providing a saddle block portion with a concaved surface for support of the spherical bearing, the opening closed by the base plate and the saddle block cover.

10. The UAV of claim 9, wherein the base plate comprises a bottom fairing for the clearance of the hinged end of the linking tube.

11. The UAV of claim 9, wherein the airfoil body comprising a top surface, a top fairing formed within the top surface of the airfoil body, the top fairing providing clearance of at least one of the hinged end of the linking tube and the hinged end of the linkage rod.

12. The UAV of claim 8, wherein the hinged end of the linking tube and the hinged end of the linkage rod are arranged in a first straight line with zero slope when the control surface has 0° deflection of the tip relative to the airfoil body.

13. The UAV of claim 12, wherein the hinged end of the linking tube and the hinged end of the linkage rod are arranged in a second straight line at a first slope when the tip is deflected upward relative to the airfoil body such that the control surface and the linking tube form a first obtuse angle.

14. The UAV of claim 13, wherein the hinged end of the linking tube and the hinged end of the linkage rod are arranged in a third straight line at a second slope when the tip is deflected downward relative to the airfoil body wherein the control surface and the linking tube form a second obtuse angle.

15. A method comprising:
   rotating an actuator arm coupled to rotate around a first rotation axis within an interior cavity of an airfoil body;
   rotating a linking arm in the cavity of the airfoil body by the actuator arm wherein the linking arm includes a linking tube and a linkage rod slideably received within the linking tube, wherein the linking tube comprising a hinged end pivotally coupled to the actuator arm about a first pivot axis parallel to the first rotation axis to cause deflection of a control surface coupled to a trailing edge of an airfoil body during rotation of the actuator arm and wherein the linkage rod comprising a hinged end pivotally coupled to a clevis about a second pivot axis coupled to the control surface;
   swivelly coupling the linking arm to a spherical bearing mounted in the cavity; and
   deflecting a tip of the control surface relative to the airfoil body via a spherical bearing providing a fixed swivel pivot which pivots the linking arm, as the linking tube simultaneously slides within the spherical bearing and, in combination, while the rod simultaneously slides within the linking tube to allow rotational freedom of motion about the first pivot axis and the second pivot axis.

16. The method of claim 15, wherein the airfoil body comprises an opening in a bottom surface providing access into the cavity in the airfoil body; and
   further comprising installing a base plate having an actuator coupled thereto, the actuator comprising a motor coupled to a main rotation hub via the first rotation axis; and installing a saddle block cover providing a saddle block portion with a concaved surface for support of the spherical bearing, the opening closed by the base plate and the saddle block cover.

17. The method of claim 16, wherein the base plate comprises a bottom fairing for the clearance of the hinged end of the linking tube.

18. The method of claim 16, further comprising the airfoil body having a top surface, the airfoil body comprising a top fairing formed within the top surface of the airfoil body, the top fairing providing clearance of at least one of the hinged end of the linking tube and the hinged end of the linkage rod.

19. The method of claim 15, wherein the hinged end of the linking tube and the hinged end of the linkage rod are arranged in a first straight line with zero slope when the control surface has 0° deflection of the tip relative to the airfoil body.

20. The method of claim 19, wherein the hinged end of the linking tube and the hinged end of the linkage rod are arranged in a second straight line at a first slope when the tip is deflected upward relative to the airfoil body such that the control surface and the linking tube form an obtuse angle and wherein the hinged end of the linking tube and the hinged end of the linkage rod are arranged in a third straight line at a second slope when the tip is deflected downward relative to the airfoil body wherein the control surface and the linking tube form an obtuse angle.

* * * * *